(12) United States Patent
Sasamoto et al.

(10) Patent No.: US 6,522,488 B2
(45) Date of Patent: Feb. 18, 2003

(54) SERVO INFORMATION WRITING METHOD AND STORAGE DEVICE

(75) Inventors: Tatsuro Sasamoto, Kawasaki (JP); Masakazu Hirano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/728,366

(22) Filed: Nov. 30, 2000

(65) Prior Publication Data

US 2001/0000302 A1 Apr. 19, 2001

Related U.S. Application Data

(63) Continuation of application No. PCT/JP99/00432, filed on Feb. 1, 1999.

(30) Foreign Application Priority Data

Sep. 17, 1998 (JP) .............................. 10-262998

(51) Int. Cl.$^7$ .............................................. G11B 27/36
(52) U.S. Cl. ........................... 360/31; 360/53; 360/75; 360/51; 360/77.08; 360/78.14
(58) Field of Search ............................ 360/31, 53, 75, 360/48, 49, 77.02, 77.08, 78.14, 51

(56) References Cited

U.S. PATENT DOCUMENTS 4,549,232 A * 10/1985 Axmear et al.
5,715,105 A * 2/1998 Katayama et al. ............. 360/53
5,757,574 A * 5/1998 Chainer et al. ................ 360/75
5,978,170 A * 11/1999 Izumiya et al. .......... 360/77.08

FOREIGN PATENT DOCUMENTS

| JP | 5094608   | * | 4/1993  |
| JP | 6243574   | * | 9/1994  |
| JP | 7287949   | * | 10/1995 |
| JP | 7-287949  | * | 10/1995 |
| JP | 7334948   | * | 12/1995 |
| JP | 7-334948  | * | 12/1995 |
| JP | 8221918   | * | 8/1996  |

* cited by examiner

Primary Examiner—Alan T. Faber
(74) Attorney, Agent, or Firm—Greer, Burns & Crain, Ltd.

(57) ABSTRACT

In a magnetic disk apparatus in which heads integrally having write heads and read heads are arranged correspondingly to data surfaces of plural media, servo information including phase servo patterns is written discretely in a track direction onto the data surfaces of the plural media. For this reason, at first, displacement amounts of the read heads with respect to the write heads are measured in each head and each cylinder position of the media. Next, phases of the phase servo patterns are adjusted so that relative displacement amounts between the reads heads are eliminated in each head and each cylinder position of the media, and the phase servo patterns are written.

20 Claims, 24 Drawing Sheets

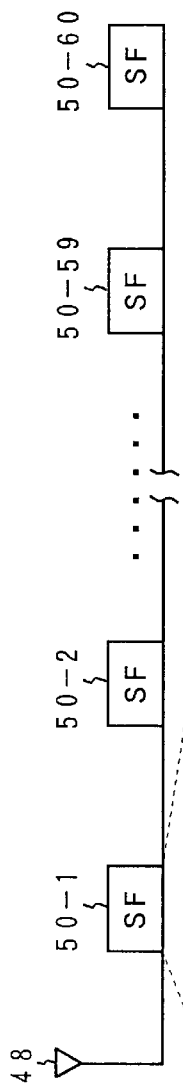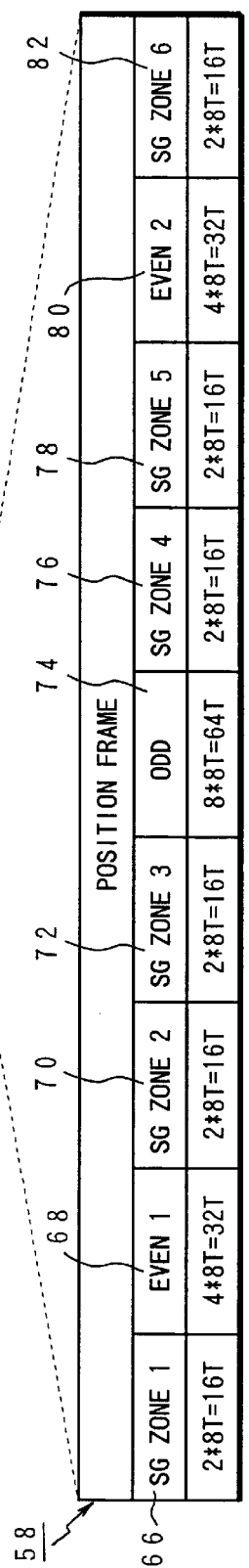
FIG. 6A
FIG. 6B

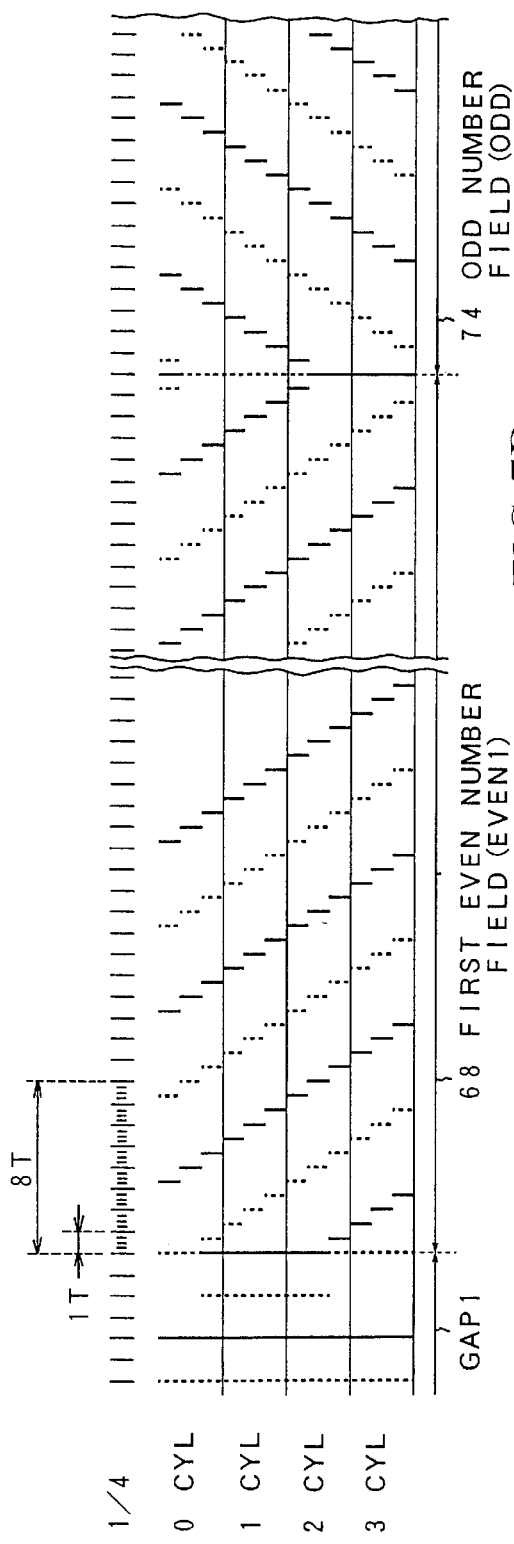
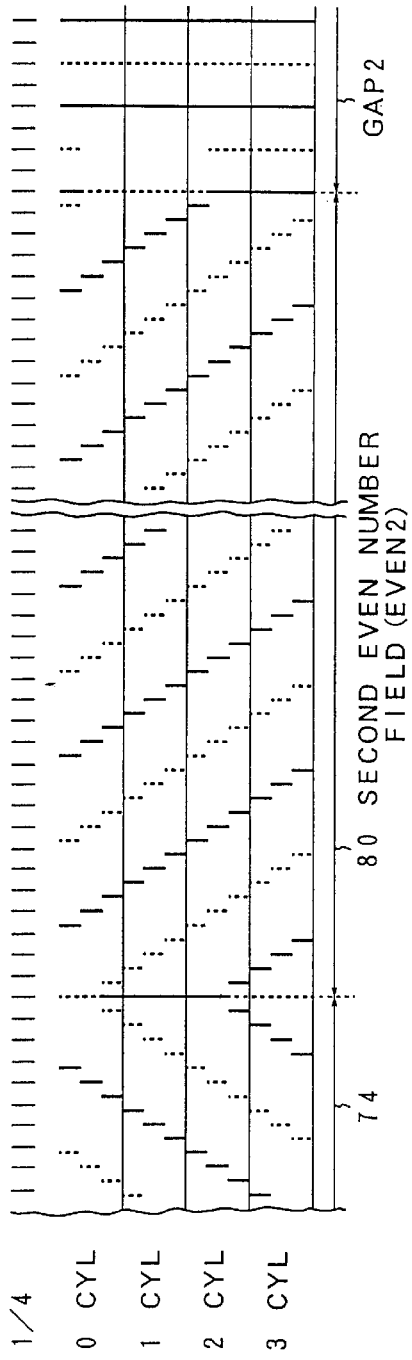
FIG.7A
FIG.7B

WRITING SIGNAL

POLARITY OF MEDIUM

READING SIGNAL

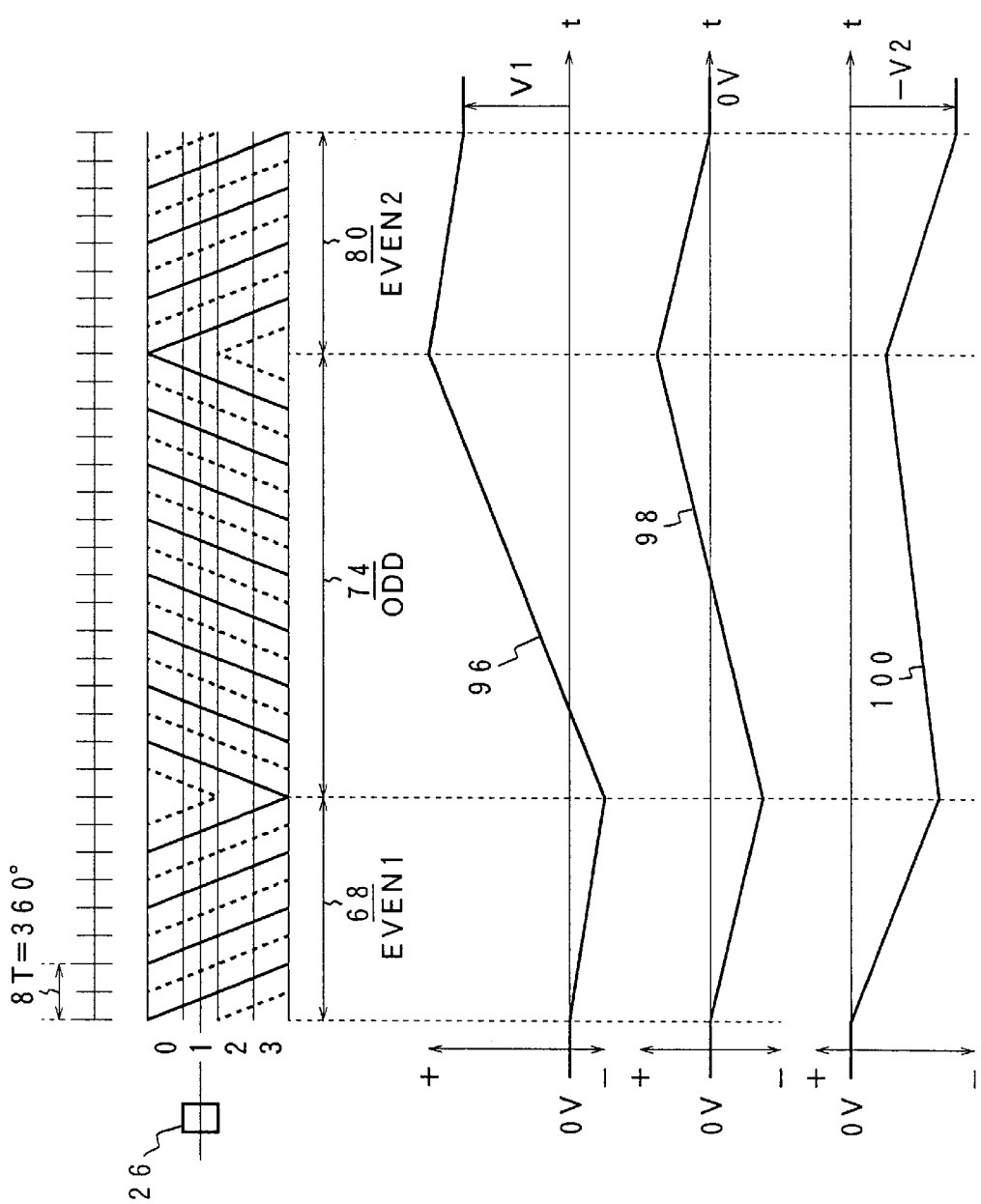
FIG. 9A 4 CYLINDER
FIG. 9B −1/4 TRACK SEEK INTEGRAL OUTPUT
FIG. 9C ON-TRACK INTEGRAL OUTPUT
FIG. 9D +1/4 TRACK SEEK INTEGRAL OUTPUT

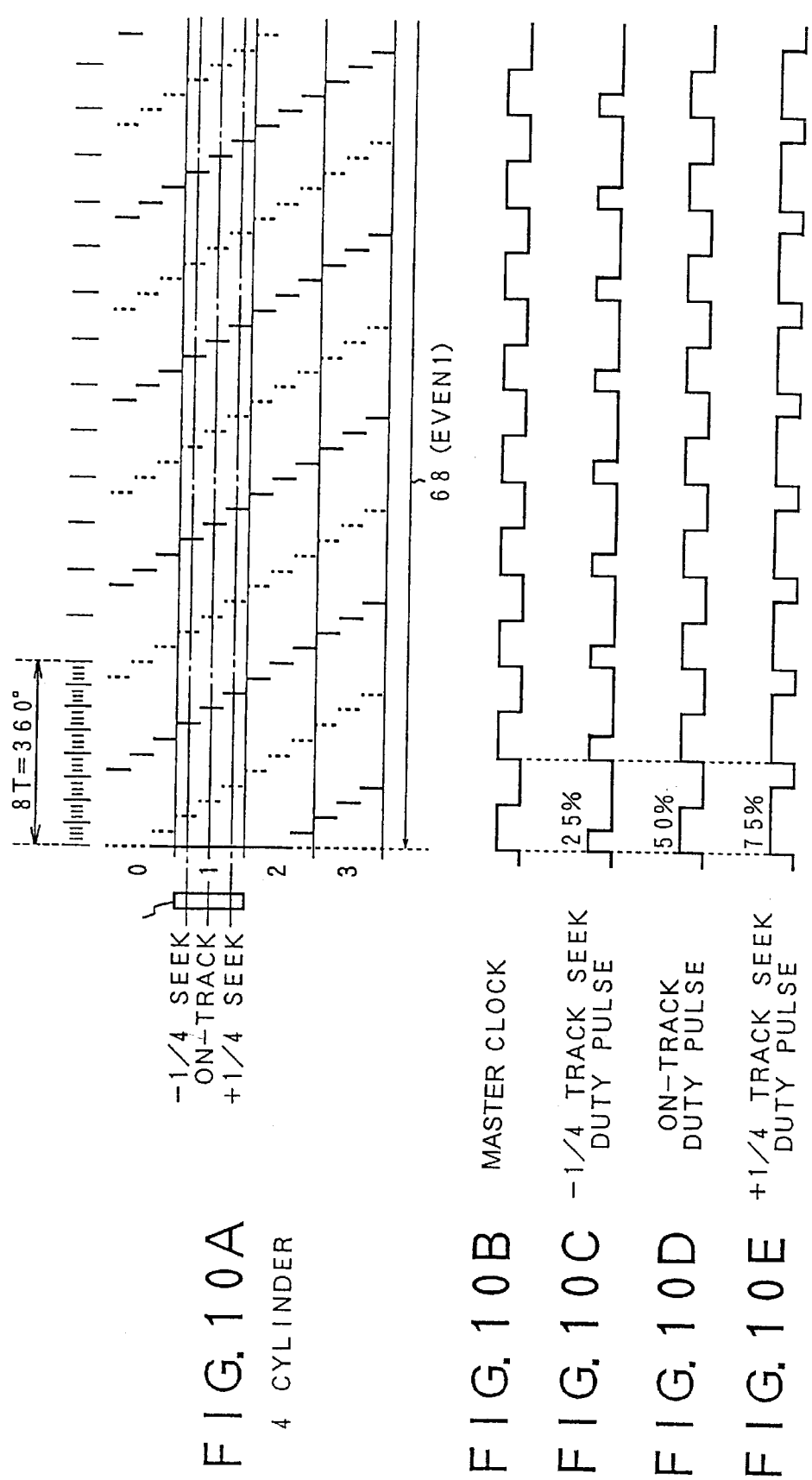

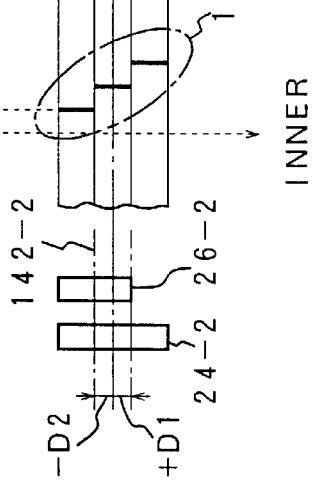
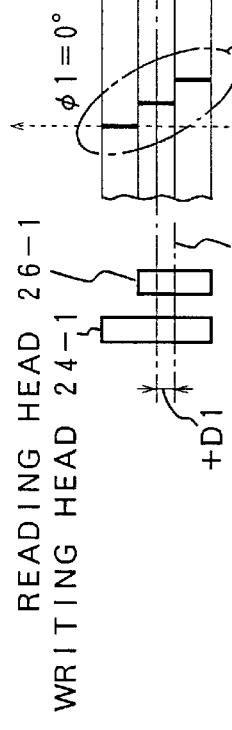
FIG. 13A NO. 1 HEAD 20-1 ($\alpha 1 = 0$)
FIG. 13B NO. 2 HEAD 20-2 ($\alpha 2 = -D2 - D1$)

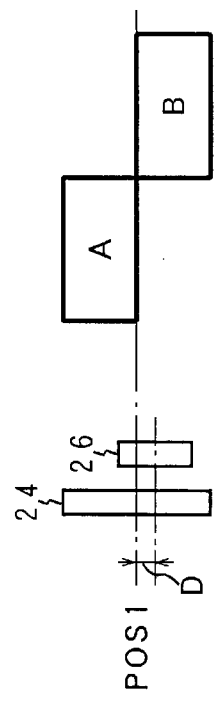
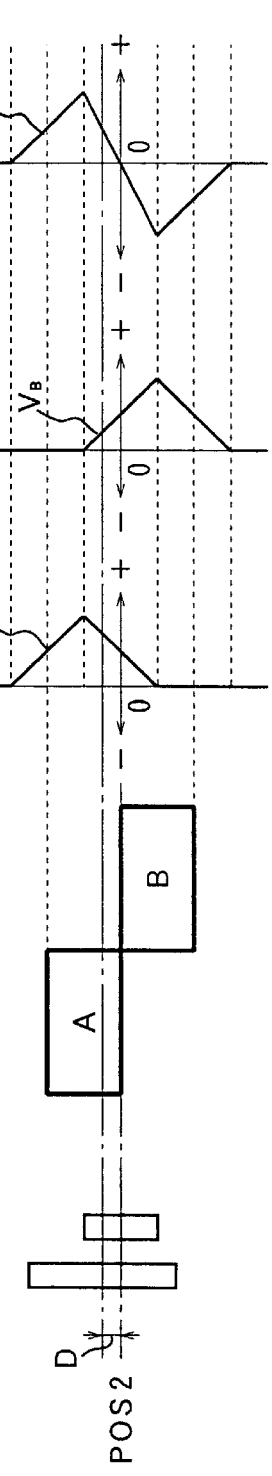
FIG. 16A
WRITE
FIG. 16B
READ

FIG. 17

| HEAD NO. HH | MEASURING CYLINDER NO. SC | DISPLACEMENT AMOUNT D | RELATIVE DISPLACEMENT AMOUNT $\alpha$ | ADJUSTING PHASE $\phi$ | CYLINDER INFORMATION OFFSET $\beta$ |
|---|---|---|---|---|---|
| 1 | SC1 | D11 | $\alpha 11$ | $\phi 11$ | $\beta 11$ |
|  | SC2 | D12 | $\alpha 12$ | $\phi 12$ | $\beta 12$ |
|  | SC3 | D13 | $\alpha 13$ | $\phi 13$ | $\beta 13$ |
|  | ⋮ | ⋮ | ⋮ | ⋮ | ⋮ |
|  | SCn | D1n | $\alpha 1n$ | $\phi 1n$ | $\beta 1n$ |
| 2 | SC1 | D21 | $\alpha 21$ | $\phi 21$ | $\beta 21$ |
|  | SC2 | D22 | $\alpha 22$ | $\phi 22$ | $\beta 22$ |
|  | SC3 | D23 | $\alpha 23$ | $\phi 23$ | $\beta 23$ |
|  | ⋮ | ⋮ | ⋮ | ⋮ | ⋮ |
|  | SCn | D2n | $\alpha 2n$ | $\phi 2n$ | $\beta 2n$ |
| 3 | SC1 | D31 | $\alpha 31$ | $\phi 31$ | $\beta 31$ |
|  | SC2 | D32 | $\alpha 32$ | $\phi 32$ | $\beta 32$ |
|  | SC3 | D33 | $\alpha 33$ | $\phi 33$ | $\beta 33$ |
|  | ⋮ | ⋮ | ⋮ | ⋮ | ⋮ |
|  | SCn | D3n | $\alpha 3n$ | $\phi 3n$ | $\beta 3n$ |
| 4 | SC1 | D41 | $\alpha 41$ | $\phi 41$ | $\beta 41$ |
|  | SC2 | D42 | $\alpha 42$ | $\phi 42$ | $\beta 42$ |
|  | SC3 | D43 | $\alpha 43$ | $\phi 43$ | $\beta 43$ |
|  | ⋮ | ⋮ | ⋮ | ⋮ | ⋮ |
|  | SCn | D4n | $\alpha 4n$ | $\phi 4n$ | $\beta 4n$ |

| HEAD NO. HH | CYLINDER NO. CC | ADJUSTING PHASE $\phi$ | CYLINDER INFORMATION OFFSET $\beta$ |
|---|---|---|---|
| 1 | 0001 | $\phi$1,0001 | $\beta$1,0001 |
| | 0002 | $\phi$1,0002 | $\beta$1,0002 |
| | 0003 | $\phi$1,0003 | $\beta$1,0003 |
| | 0004 | $\phi$1,0004 | $\beta$1,0004 |
| | ⋮ | ⋮ | ⋮ |
| | 2000 | $\phi$1,2000 | $\beta$1,2000 |
| 2 | 0001 | $\phi$2,0001 | $\beta$2,0001 |
| | 0002 | $\phi$2,0002 | $\beta$2,0002 |
| | 0003 | $\phi$2,0003 | $\beta$2,0003 |
| | 0004 | $\phi$2,0004 | $\beta$2,0004 |
| | ⋮ | ⋮ | ⋮ |
| | 2000 | $\phi$2,2000 | $\beta$2,2000 |
| 3 | 0001 | $\phi$3,0001 | $\beta$3,0001 |
| | 0002 | $\phi$3,0002 | $\beta$3,0002 |
| | 0003 | $\phi$3,0003 | $\beta$3,0003 |
| | 0004 | $\phi$3,0004 | $\beta$3,0004 |
| | ⋮ | ⋮ | ⋮ |
| | 2000 | $\phi$3,2000 | $\beta$3,2000 |
| 4 | 0001 | $\phi$4,0001 | $\beta$4,0001 |
| | 0002 | $\phi$4,0002 | $\beta$4,0002 |
| | 0003 | $\phi$4,0003 | $\beta$4,0003 |
| | 0004 | $\phi$4,0004 | $\beta$4,0004 |
| | ⋮ | ⋮ | ⋮ |
| | 2000 | $\phi$4,2000 | $\beta$4,2000 |

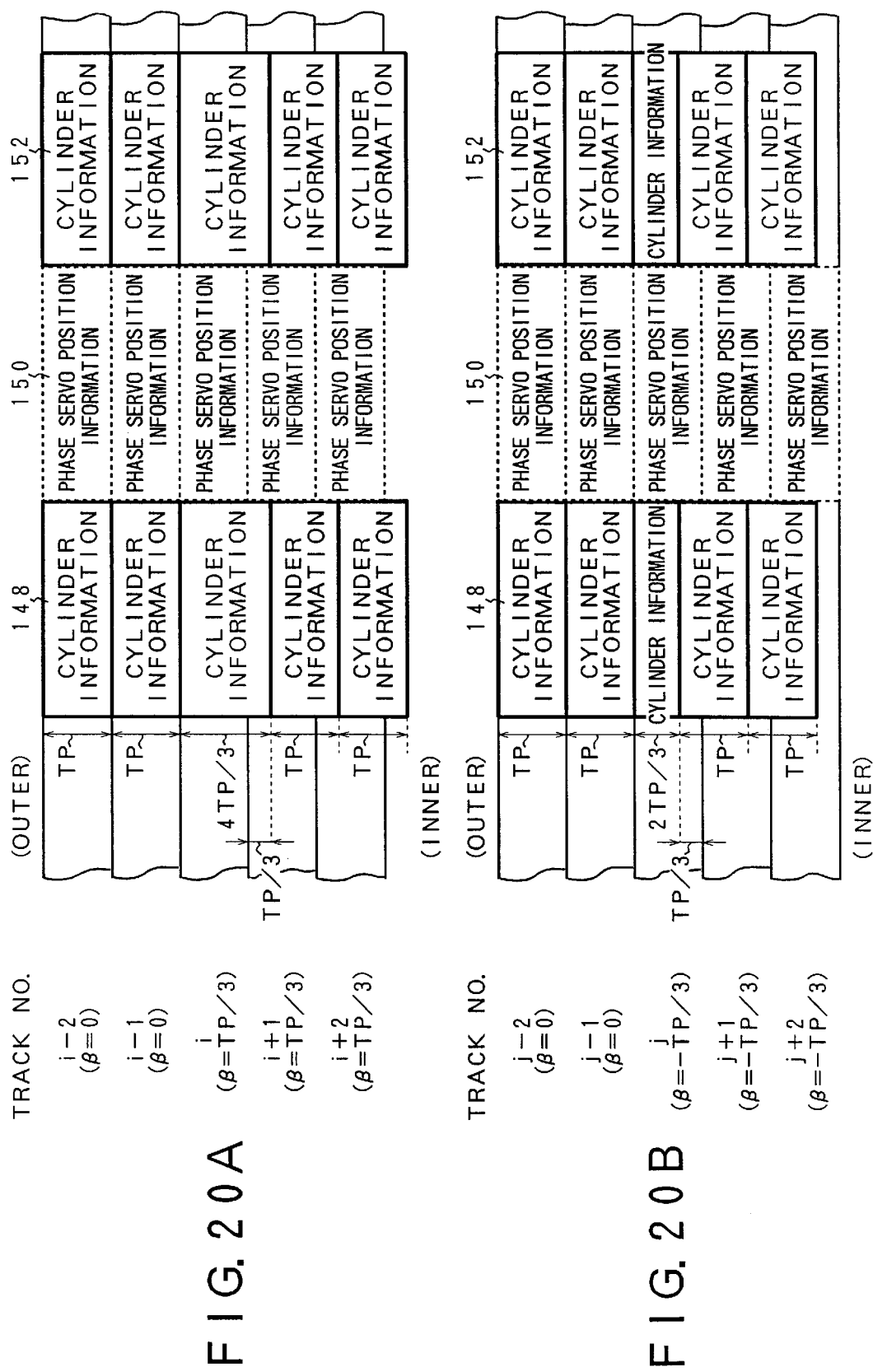

NO. 1 HEAD  20-1

NO. 2 HEAD  20-2

NO. 3 HEAD  20-3

NO. 4 HEAD  20-4

SELECT NO. 1 HEAD 20-1

SELECT NO. 2 HEAD 20-2

SELECT NO. 3 HEAD 20-3

SELECT NO. 4 HEAD 20-4

SELECT NO. 1 HEAD 20-1

FIG. 25A  NO. 1 HEAD  20-1
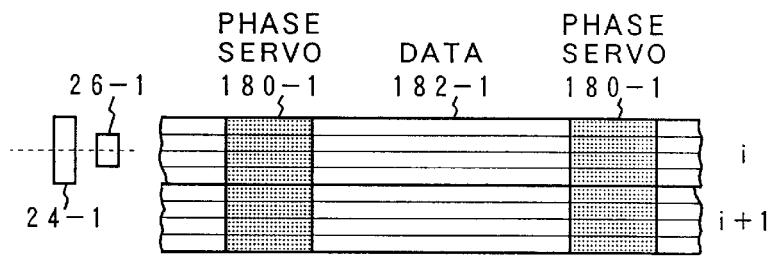
FIG. 25B  NO. 2 HEAD  20-2
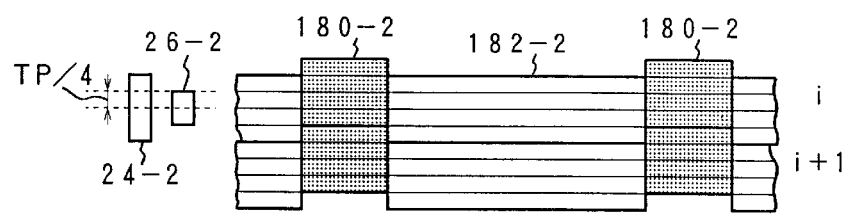
FIG. 25C  NO. 3 HEAD  20-3
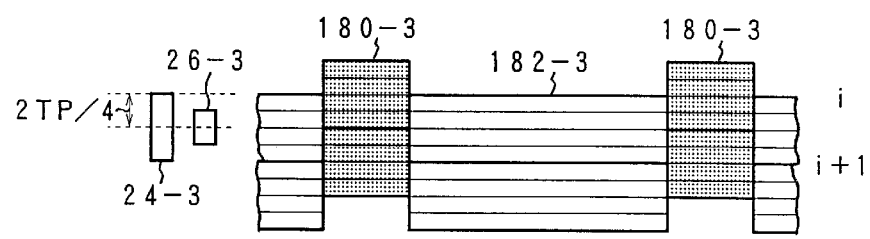
FIG. 25D  NO. 4 HEAD  20-4
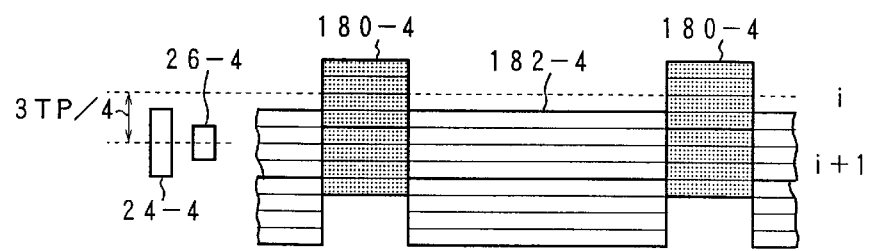

SERVO INFORMATION WRITING METHOD AND STORAGE DEVICE

This is a continuation of International PCT application No. PCT/JP99/00432, filed Feb. 1, 1999, which was not published in English.

TECHNICAL FIELD

The present invention relates to a servo information writing method and a storage device for recording servo information including phase servo patterns discretely in a track direction of respective data surfaces of plural media and reproducing the servo information by means of heads provided with write heads and read heads integrally, and particularly relates to a servo information writing method and a storage device which do not require correction of position signals at the time of switching the heads even if read heads displace physically.

BACKGROUND ART

Conventionally, in a magnetic disk apparatus manufacturing process, at the stage that a disk enclosure is assembled and manufactured, servo patterns are written onto data surfaces of media by a servo track writer (STW), namely, servo patterns are servo-written. In the servo write using the servo track writer, heads are moved and located in objective cylinder positions successively by a laser locating apparatus or the like from an outer side towards an inner side. Write heads of the respective heads provided correspondingly to the data surfaces in the cylinder positions are switched successively so that the servo patterns are written onto the same cylinder positions of the respective data surfaces. For this reason, the positions of the servo patterns written onto the respective data surfaces are determined by positions of the write heads of the respective heads.

In order to cope with recent large capacity and high recording density, as a recording/reproduction head to be used in a magnetic disk apparatus, a combined head, in which a write head using an inductive head and a read head using, for example, an MR head are integrated, is used. Since the write head and the read head are different from each other physically, their relative positions disperse.

FIG. 1A shows an arrangement of a write head and a read head in a downward No. 1 head 200 which is arranged on a front data surface of a medium. FIG. 1B shows an arrangement of a write head and a read head in an upward No.2 head 202 which is arranged on a rear surface of the same medium. In the No. 1 head 200, a track center 216 of the read head 208 displaces from a track center 212 of the write head 204 towards an inner side by +D1. On the contrary, in the No. 2 head 202, a track center 218 of the read head 210 displaces from a track center 214 of the write head 206 towards an outer side by −D2. Since the No. 1 head 200 faces downward and the No. 2 head 202 face upward, their displacement directions are opposite to each other.

FIGS. 2A and 2B show displacement of the track centers in the case where servo patterns are recorded onto the same cylinder and read therefrom by the heads 200 and 202 shown in FIGS. 1A and 1B. At first, in the No. 1 head 200 in FIG. 2A, a phase is displaced to both sides of the track center 212 by the write head 204 and servo patterns A and 2B of a write track width are recorded alternatively. Similarly, in the No. 2 head 202 in FIG. 2B, a phase is displaced to both sides of the track center 214 by the write head 206 and servo patterns A and B of a write track width are recorded alternatively. The servo patterns A and B are read by the read heads 208 and 210 having amounts −D1 and +D2 of displacement from the track centers 212 and 214, and track centers which satisfy the following relationship:

(pattern A read signal)=(pattern B read signal)

are obtained. In this case, the write head 204 has a track center 220 and the write head 206 has a track center 222, and the track centers of the respective write heads are different from each other due to the respective read heads.

Further, such heads are mounted to rotary actuators, and an offset amount is different in respective cylinder positions. FIG. 3 shows an example of the No. 1 head 200. In the case where the head 200 is located on a medium surface 228 by a rotary actuator 226 having a rotational center 224, an offset is zero in a center position where a yaw angle θ is zero, but the offset is large according to yaw angles θ1 and θ2 on innermost and outermost positions. The directions of the offset are opposite to each other in the outer and inner sides. For this reason, in the case where the heads are located in positions where read signals of the servo patterns A and B are equal to each other by the read heads 208 and 210 at the time of data writing as shown in FIGS. 2A and 2B, a condition that the read signals of the servo patterns A and B are equal to each other fails every time when the head is switched in the same cylinder position. As a result, the head should be relocated at every time of switching.

In one method to eliminate the relocating due to switching of the heads, a displacement amount of the write head and the read head in each head is previously measured, displaced position signals are offset so as to be correct position signals. For example since an offset of the No. 1 head is D1, the offset D1 is added to the position signal of the track center 220 where the read signals of the servo patterns A and B are equal to each other so that the correct position signal of the track center 212 can be obtained.

Due to such offset correction of the position signal, although a value of the position signals on the track center changes every time when the heads are switched, the heads do not move physically. However, in this case, displacement amounts of the write heads and the read heads in each head and each cylinder position are stored in a memory of the magnetic disk apparatus, and the displacement amounts should be read out from the memory in each head and each cylinder and the position signals should be corrected. For this reason, in the case, for example, where a number of heads is four and each data surface has 2000 cylinders, it is necessary to store 8000 displacement amounts onto the memory, and a memory capacity of the apparatus becomes larger.

In addition, in another solving method, the servo patterns A and B are displaced to the center position of the read heads so as to be written at the time of servo write using the servo track writer (STW), and the track centers read by the read head coincide with each other in each head. For example, in the No. 1 head 200 shown in FIG. 2A, the write head 204 is offset to the inner side by the shift amount D1 of the read head 208, and the servo patterns A and B are written. Moreover, in the No. 2 head 202 shown in FIG. 2B, the write head 206 is offset to the outer side by the shift amount D2 of the read head 210, and the servo patterns A and B are written. However, in this method, the offset operation of the head is required every time when the servo patterns of each head are written, thereby requiring long time for the servo writing operation. As a result, there arises a problem that the producing efficiency is deteriorated.

DISCLOSURE OF THE INVENTION

The present invention provides a servo information writing method and a storage device which uses phase servo patterns as position information of servo information, and does not require an offset operation at the time of writing corrected servo patterns of position signals at the time of switching heads even if physical displacement occurs on respective read heads.

The present invention provides a servo information writing method of writing servo information including phase servo patterns discretely in a track direction onto data surfaces of plural media in a magnetic disk apparatus in which heads integrally having write heads and read heads are arranged correspondingly to the data surfaces of the plural media.

(Phase Servo Writing which Eliminates Displacement of Read Head)

A servo information writing method is characterized by including:

the measuring step of measuring displacement amounts D of the read heads with respect to the write heads in each head and each cylinder position on the media surfaces; and the position information writing step of adjusting phases of the phase servo patterns based on the measured displacement amounts D so that relative displacement amounts between the read heads are eliminated in each head and each cylinder position of the media surfaces so as to write the phase servo patterns. According to the phase servo patterns recorded by such a servo information writing method, even if relative displacement exist between the read heads, a chanqe in the head position signals detected from the phase servo patterns due to the head switching is enough small to be ignored. For this reason, time for locating at the time of head switching is shortened, and access stopping time for this time can be shortened so that the performance of the apparatus can be improved. Moreover, since it is not necessary to store displacement amounts to be used for correcting the position signals, a memory capacity of the apparatus is reduced. Further, offset seek of the write heads at the time of servo write is not required, and thus operating efficiency of the servo write can be improved.

Here, the position information writing step adjusts the phases of the phase servo patterns so that a relative displacement amount a of another read head, for example a No. 2 head, with respect to a specified read head (No. 1 head) is eliminated and writes the phase servo patterns. More concretely, the relative displacement amount a (=D1+D2) of another read head with respect to a specified read head is calculated from the measured displacement amounts D1 and D2 of the read heads with respect to the write heads in each cylinder position of each head, and the relative displacement amount a is converted into a phase angle $\phi$ of the phase servo patterns. The phase servo patterns are written onto the media surfaces of the specified head in each cylinder position in a state that the phase angle $\phi$ is zero, and finally the phase servo patterns are displaced by the phase angle $\phi$ so as to be written onto the media surfaces of the read heads other than the specified head.

Further, in another form, the position information writing step adjusts the phases of the phase servo patterns so that relative displacement amounts of the read heads with respect to the write heads, namely, the measured displacement amounts D are eliminated so as to write the phase servo patterns. More concretely, the measured values of the displacement amounts D of the read heads with respect to the write heads are converted into phase angles $\phi$ of the phase servo patterns in each cylinder position of each head, and the phase servo patterns are displaced by the phase angle $\phi$ in each cylinder position of each head so as to be written. Here, in the case where the phase servo patterns are recorded in a state that N cylinders form 1 unit, the position information writing step calculates the phase angle $\phi$ from the phase displacement amount ($\alpha$ or D) according to the following equation:

$$\phi = (360°/N) \cdot (\text{displacement amount})$$

In the case, for example, where the phase servo patterns are recorded for each four cylinders, the phase angle $\phi$ is calculated from the displacement amount ($\alpha$, D) according to the following equation:

$$\phi = 90° \cdot (\text{displacement amount}).$$

The position information writing step converts the phase angle $\phi$ into delay time $\tau d$ so as to set it to a programmable delay line, and changes the phases of writing reference clocks read from the media surfaces so as to adjust the writing phases of the phase servo patterns.

The measuring step measures the displacement amounts D of the read heads with respect to the write heads by means of measuring cylinders in a plurality of positions from the outer to inner sides of the respective media surfaces. Moreover, the position information writing step obtains displacement mounts of non-measuring cylinders from the displacement amounts of the measuring cylinder by means of interpolation, and adjusts the phases of the phase servo patterns so that the relative displacement amounts between the read heads based on the measured displacement amounts and the interpolated displacement amounts, and writes the phase servo patterns. Further, the measuring step writes a pair of burst patterns onto both sides of the track center alternatively by means of the write heads in each measuring cylinder with the phases being displaced, and measures the displacement amounts D of the read heads with the write heads based on head moving amounts to a position where read signals the paired burst patterns by means of the read heads are equal to each other.

Meanwhile, since the present invention does not require an offset operation of the write heads, at the time of switching the heads, when the displacement amount of the read heads is increased, the reads heads exceed a boundary of the tracks so as to be overlapped on the cylinder information using the burst patterns included in the servo information in the adjacent cylinder. As a result, misreading of the cylinder information possibly occurs. Therefore, the servo information writing method of the present invention further includes the cylinder information writing step of offsetting cylinder information to be written with the phase servo patterns according to the displacement amounts of the read heads with respect to the write heads in each head and each cylinder position so as to write the cylinder information. The cylinder information writing step, in the case where the phase servo patterns are displaced by (1/n) track pitch unit for 1 cylinder in a state that N cylinders form 1 unit so as to be recorded, converts the displacement amounts of the read track center into head feeding amounts for (1/n) track pitch unit so as to offset-seek the phase servo patterns. As a result, the cylinder information can be offset-written by directly using the feeding pitch at the time of writing the phase servo patterns. In the cylinder information writing step, in the case where the cylinder information which is not subject to offset seek is adjacent to the cylinder information which is subject to be offset seek and written, one of the information is narrower than 1 track width, and the other is wider than 1 track width.

In addition, the present invention provides a storage device which does not require correction of position signals at the time of switching the heads even if physical displacement occurs in each read head. The storage device is constituted so that a plurality of heads integrally having write heads and read heads corresponding to data surfaces of plural media are located in arbitrary cylinder positions so as to perform recording/reproduction, and servo information including phase servo patterns is discretely recorded onto the data surfaces of the plural media in a track direction. The storage device of the present invention is characterized in that the phase servo patterns in which their phases are adjusted so that relative displacement amounts between the read heads are eliminated are previously recorded onto the data surfaces of the plural media each head and cylinder position.

The phases of the phase servo patterns are adjusted so that relative displacement amounts of another read heads with respect to a specified read head are eliminated, and the phase servo patterns are recorded on the data surfaces of the plural media. More concretely, the previously measured relative displacement amounts D of another read heads with respect to a specified read head are converted into phase angles φ of the phase servo patterns in each cylinder position of each head, the phase servo patterns are previously recorded onto the media surfaces of the specified read head in each cylinder position in a state that the phase angle φ is zero, and the phases are displaced by the phase angles φ so that the phase servo patterns are previously recorded onto the media surfaces of the read heads other than the specified read head.

In addition, in another form of respective data surfaces of the plural media provided in the storage device, the phases of the phase servo patterns are adjusted so that relative displacement amounts (measured displacement amount) D of the read heads with respect to the write heads are eliminated, and the phase servo patterns are previously recorded. More concretely, the phase servo patterns are displaced by the phase angles φ of the phase servo patterns converted from the previously measured displacement amounts D in each cylinder position of each head so that the phase servo patterns are previously recorded.

In the case where the phase servo patterns are recorded onto the data surfaces of the plural media provided in the storage device in a state that N cylinders form 1 unit, the phase angle φ is calculated from the displacement amount (α or D) according to the following equation:

$$\phi = (360°/N) \cdot (\text{displacement amount}).$$

Cylinder information to be written with the phase servo patterns is offset from a track center according to the displacement amounts of the read heads with respect to the write heads in each head and each cylinder position so as to be previously recorded further onto the data surfaces of the plural media provided in the storage device. In the case where the phase servo patterns are displaced by (1/n) track pitch unit for 1 cylinder in a state that N cylinders form 1 unit so as to be recorded, the displacement amounts of the read track center are converted into head feeding amounts of the (1/n) trackpitch unit, and the cylinder information which is subject to offset seek is previously recorded onto the data surfaces of the plural media provided in the storage device. In the case where the cylinder information which is recorded without offset seek is adjacent to the cylinder information which is offset-recorded, one of the cylinder information is narrower than 1 track width and the other one is wider than 1 track width.

(Track Seek by Phase Adjustment at the time of Switching Heads)

Another embodiment of the present invention provides a servo information writing method which utilizes a function for correcting position signals by means of phase adjustment of phase servo patterns, and facilitates a seek operation for sequential access or the like for switching heads successively between continuous plural cylinders so as to improve an access performance. Namely, the servo information writing method of discretely recording servo information including phase servo patterns in a track direction onto data surfaces of plural media in a storage device in which heads integrally having write heads and read heads corresponding to the data surfaces of the plural media, is characterized in that in the case where a number of heads corresponding to the media surfaces is M, the phases of phase servo patterns are displaced by (1/M) track pitch in an order of the head numbers in the same cylinder positions of the media surfaces and the phase servo patterns are written so that position information read from the phase servo patterns by the read heads is displaced by the (1/M) track pitch in the order of the head numbers. For this reason, in the case where the final head in the No. i cylinder is switched into a front head in the next No. (i+1) cylinder, conventional 1-track seek which requires a high-order command is not utilized, offset seek of 1/M track pitch which requires only an internal process of the storage device may be utilized. As a result, an access performance can be improved.

Here, in the case where the phase servo patterns are recorded in the state that N cylinders form 1 unit, a phase angle φ corresponding to the (1/M) track pitch is calculated according to the following equation:

$$\phi = (360°/N) \cdot (1/M)$$

and the phase servo patters are displaced by the phase angle φ in the order of the head numbers so as to be written in the same cylinder positions of the media surfaces. For example, in the case where a number of the heads is four and the phase servo patterns are recorded in unit of four cylinders, the phase servo patterns are displaced by the phase angle φ of 22.5° in the order of the head numbers so as to be written. As for the adjustment of the writing phases of the phase servo patterns, the phase angle φ is converted into delay time τd so as to be set in the programmable delay line, and phases of writing reference clocks read from the media surfaces are changed.

Further, the present invention provides an apparatus in which a plurality of heads integrally having write heads and read heads corresponding to data surface of plural media are located in arbitrary cylinder positions and performs recording/reproduction, and servo information including phase servo patterns is recorded discretely in a track direction onto the data surfaces of the plural media, characterized in that in the case where a number of heads corresponding to the media surfaces is M, phases of the phase servo patterns are displaced by (1/M) track pitch in an order of the head numbers in the same cylinder positions of the media surfaces and the phase servo patterns are previously recorded onto the data surfaces of the plural media so that position information read from the phase servo patterns by the read heads is displaced by (1/M) track pitch in the order of the head numbers. Also in this case, in the case where the phase servo patterns are recorded in a state that N cylinders form 1 unit, the phase angle φ corresponding to the (1/M) track pitch is calculated according to the following equation:

$$\phi = (360°/N) \cdot (1/M),$$

and the phase servo patterns are displaced by the phase angle φ in the order of the head numbers in the same cylinder positions of the media surfaces so as to previously recorded onto the data surfaces of the plural media.

BRIEF DESCRIPTION OF THE DRAWINGS

FIGS. 6A and 6B are explanatory diagrams of a servo track format to be recorded in the present invention;

FIGS. 7A and 7B are explanatory diagrams of the phase servo pattern recorded in position frames of FIGS. 6A and 6B;

FIGS. 9A to 9D are time charts of duty pulses created for reproducing position signals from the phase servo patterns;

FIGS. 10A to 10E are time charts of a process for reproducing position signals obtained by reading the phase servo patterns;

FIGS. 13A and 13B are explanatory diagrams of the phase serve patterns where the phases are adjusted so that displacements between the read heads are eliminated;

FIGS. 16A and 16B are explanatory diagrams of a burst servo pattern to be used for measuring the head displacement in FIG. 13;

FIG. 17 is an explanatory diagram of a work table generated by measuring the head displacement in FIG. 13;

FIG. 19 is an explanatory diagram of a correction work table created by interpolating calculation from the work table in FIG. 17;

FIGS. 20A and 20B are explanatory diagrams of offset writing of cylinder information executed by the servo information writing process;

FIGS. 25A to 25D are explanatory diagrams of data and phase servo recorded in the offset seek due to the head switching in FIGS. 24A to 24E.

BEST MODE FOR CARRYING OUT THE INVENTION (Phase Servo Pattern)

Figure 4:
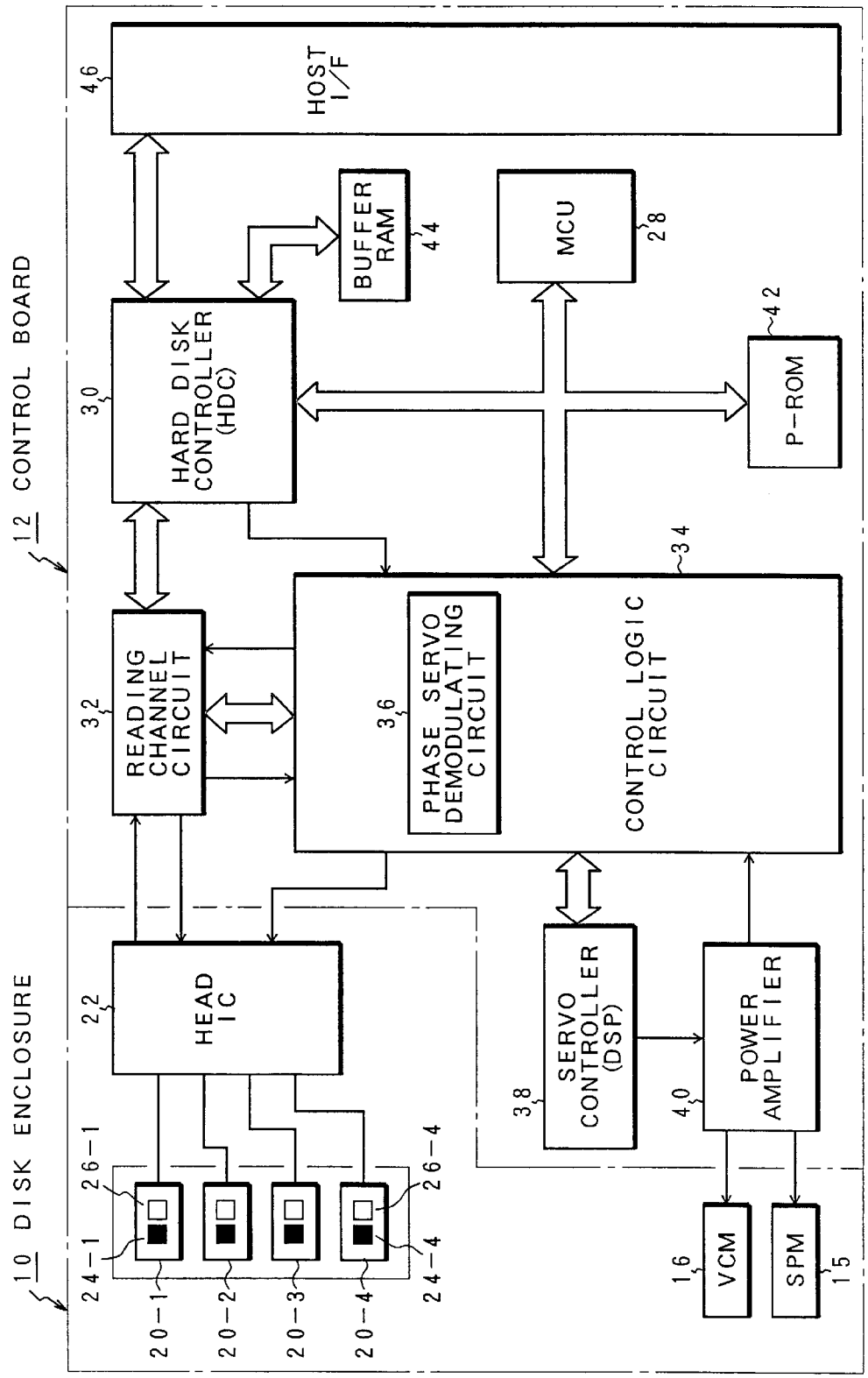
FIG. 4 is a block diagram of a hard disk drive of the present invention into which phase servo information is written.

FIG. 4 is a block diagram of a hard disk drive into which phase servo patterns are written by a servo information writing method of the present invention. In FIG. 4, the hard disk drive is composed of a disk enclosure 10 and a control board 12. The disk enclosure 10 is provided with, for example, four combined heads 20-1 to 20-4 for a head IC 22. The combined heads 20-1 to 20-4 are provided with write heads 24-1 to 24-4 using inductive heads and read heads 26-1 to 26-4 using MR heads respectively. Further, the disk enclosure 10 is provided with a spindle motor 15 and a voice coil motor (VCM) 16.

Figure 5:
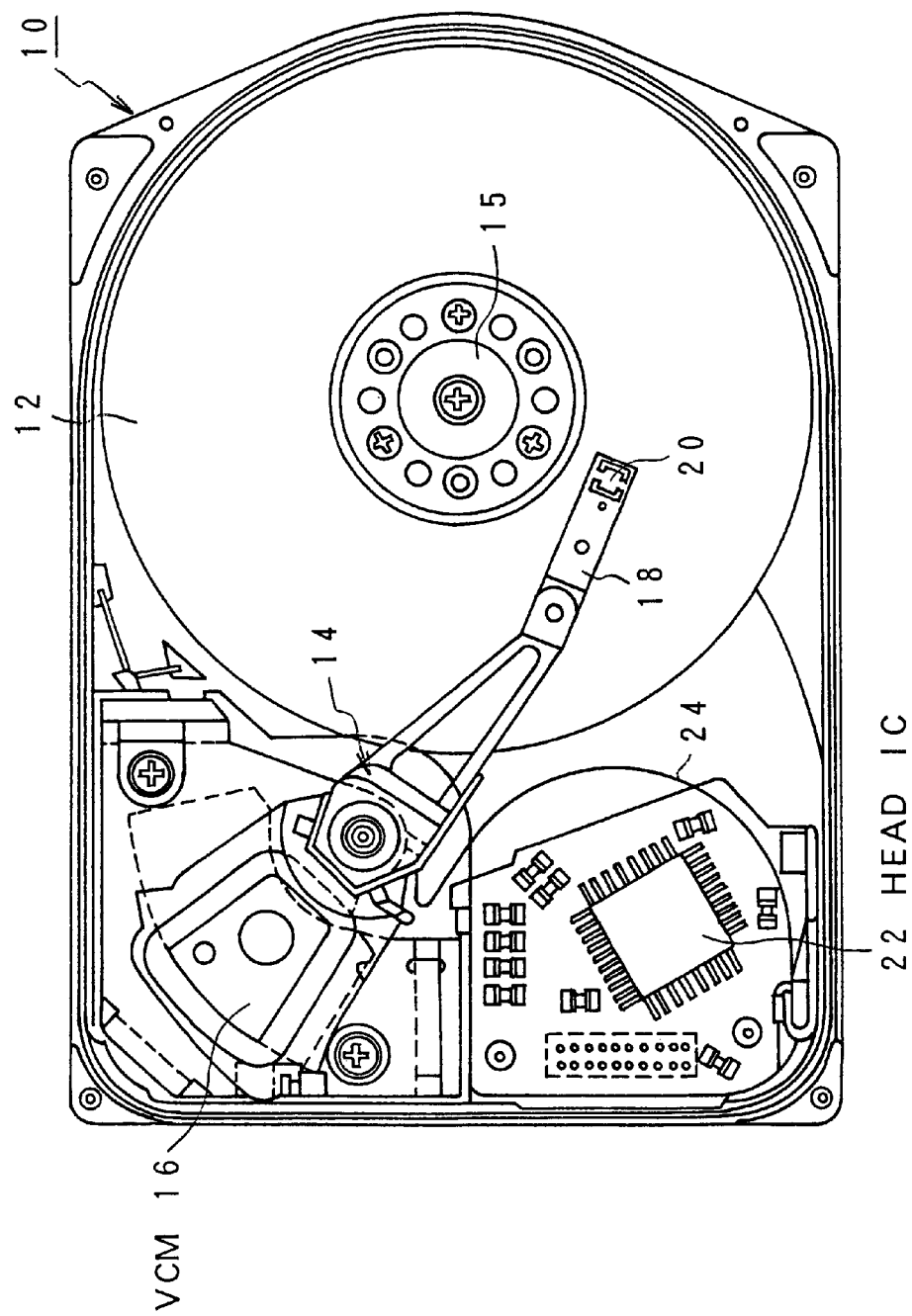
FIG. 5 is an explanatory diagram of an internal structure of a disk enclosure of FIG. 4.

FIG. 5 shows an internal structure of the disk enclosure of FIG. 4. In the disk enclosure 10, a plurality of magnetic disks 12 rotated by the spindle motor 15 are overlapped to be arranged, and a rotary actuator 14 is provided for the magnetic disks 12. The rotary actuator 14 is provided with the VCM 16 on its outer side, and a head assembly 18 is offset to be arranged on its edge side.

The combined heads 20 are mounted to the point of the head assembly 18. Moreover, the head IC 22 is mounted onto an FPC on a bottom section of the disk enclosure 10, and the head IC 22 and the rotary actuator 14 are connected by an FPC band section 24. As shown in FIG. 4, the disk enclosure 10 is provided with the four combined heads 20-1 to 20-4, the two magnetic disks 12 are overlapped for the spindle motor 15, the two magnetic disks 12 have front and rear data surfaces respectively, namely, four data surfaces exist, and the four combined heads 20-1 to 20-4 are provided correspondingly to the four data surfaces. Needless to say, a number of the magnetic disks 12 and a number of the combined heads corresponding to the magnetic disks can be set suitably as the need arises.

With reference to FIG. 4 again, the control board 12 side is provided with a microcontrol unit (MCU) 28 for controlling the whole hard disk drive, a hard disk controller (HDC) 130, a read channel circuit 32, a control logic circuit 34 having a phase servo demodulation circuit 36, a servo controller 38 using DSP for driving the VCM 24 and the spindle motor 26 by means of a power amplifier 40, a flash P-ROM 42 provided as a non-volatile memory, a buffer RAM 44 using a D-RAM, and a host interface 46 as a high-order apparatus for transmitting/receiving data and signals between hosts.

FIGS. 6A and 6B are explanatory diagrams for a servo track format which is written into the magnetic disks 12 provided in the disk enclosure 10 of FIG. 5 at the stage of manufacturing and assembly by using a servo track write (STW). The servo track format is composed of continuous sixty servo frames 50-1 to 50-60, for example, for one track in an index 48 as shown at the topmost step of FIG. 6A. The servo frames 50-1 to 50-60 are, as represented by the servo frame 50-1, composed of a W/R recovery area 52, a servo mark area 54, a gap area 56, a position area 58, a gap area 60, a gray code area 62 and a gap area 64. Sizes of the respective areas are shown by a basic cycle 1T as 1 unit determined by a number of rotations of the magnetic disk.

Moreover, a writing clock of the servo information has T/4 resolution. For example, time of 1T and T/4 is as follows:

1T=7.207 ns=1/138.75 MHz;

and

T/4=1.802 ns=1/555.00 MHz.

The recovery area 52 is composed of repetition of 2T data of "10" in binary, and this area absorbs transient which is generated when a writing operation in a data area is switched into a servo-reading operation. Continuous forty binary "0"s are written in the servo mark area 54, and the continuous nine binary "0"s, namely, "000000000" is detected twice so that a servo mark is detected. This servo mark determines a starting position of the position area 58. The gap areas 56, 60 and 64 compensate synchronization displacement of servo marks and a delay of a reference counter, and a dummy pattern is written into this area so that a pattern of more than 4T does not exist before and after the position area 58. As shown in a lower section of FIG. 6A, the position area 58 is composed of three areas: a first even-number field (EVEN 1) 68; an odd-number field (ODD) 74; and a second even-number field (EVEN 2) 80.

FIG. 7 shows a state that phase servo patterns of the first even-number field 68, the odd-number field 74 and the second even-number field 80 in the position area 60 of FIG. 6A are taken out. The phase servo patterns are recorded in a state that the four cylinders shown by 0 to 3 CYLs form 1 unit and 1 cycle and binary "1001000" of 1 cycle 8T in a track direction. Moreover, they are recorded so that the phases are delayed by 90° to a head moving direction for 1 cylinder. Further, in this embodiment, the phase servo patterns are recorded with 1/3 cylinder feed for 1 cylinder, and thus the phase for 1/3 cylinder is delayed by 90°. Moreover, as shown in FIG. 6A, the first even-number field 68 and the second even-number field 80 have a recording length of 4×8T=32T, and on the contrary, the odd-number field 74 has a recording length of 8×8T=64T that is two times as much as the even-number fields.

Figure 8A:
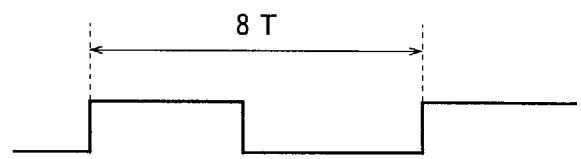
FIGS. 8A to 8D are explanatory diagrams of magnetic recording of the servo patterns in FIGS. 7A and 7B.
Figure 8B:
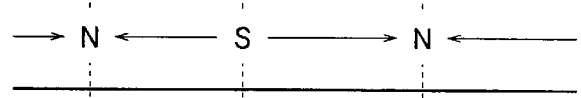
Figure 8C:
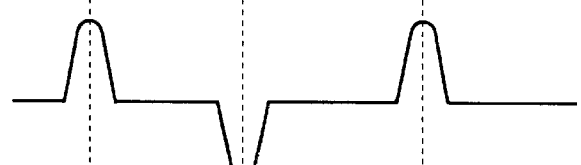
Figure 8D:
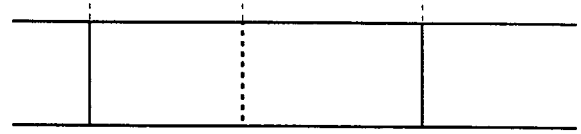

Here, the phase patterns of FIG. 7 are represented by solid lines and dotted lines, and they correspond to magnetic recording of the servo patterns in FIGS. 8A to 8D. FIG. 8A shows a write signal, and as shown in FIG. 8B, magnetic recording is performed in a longitudinal direction so that polarity of a medium is magnetized by N at rising of the write signal, and the polarity of the medium is magnetized by S at falling of the write signal. A read signal which is obtained by reading the magnetization state of the medium, as shown in FIG. 8C, has a positive reading waveform at the N-pole magnetized portions of the medium and has a negative reading waveform at the S-pole magnetized portions. In the actual servo pattern, since an interval between the N pole and S pole is very short, the read waveform of FIG. 8C becomes a continuous sin waveform. FIG. 8D schematically shows the magnetization state of the medium of FIG. 8B with respect to the magnetic recording of such servo patterns. The N-pole magnetized portion is represented by a solid line, and the S-pole magnetized portion is represented by a dotted line. The results of the magnetic recording of such servo patterns are obtained as the recording state of the respective fields of the phase servo patterns in FIG. 7.

FIGS. 9A to 9D are time charts of a demodulation operation of the phase servo demodulation circuit 36 provided in the control logic circuit 34 of FIG. 4 for reproducing position signals from read signals of the phase servo patterns of FIG. 7 by means of the read heads. FIG. 9A is phase servo patterns where four cylinders compose one unit, and for simple explanation, the phase servo patterns of FIG. 7 are represented by straight solid line or broken line. FIGS. 9B to 9D show integral waveforms 96, 98 and 100 based on the read signals of the phase servo patterns in the respective cases where the read head 26 is positioned in the No. 1 cylinder of FIG. 9A, −1/4 track seek to the outer side from the track center, locating on the track center and +1/4 track seek to the inner side are performed. The integral operations are performed to a minus direction in the first even-number field 68, to a plus direction in the odd-number field 74 and to the minus direction in the second even-number field 80. An integrate output in the on-track state of FIG. 9C is performed symmetrically with respect to a zero volt, and a finally obtained integral output is the zero volt. On the contrary, in the state that the −1/4 track seek is -performed to the outer side in FIG. 9B, an integral output V1 having plus polarity is obtained. On the contrary, in the state that the +1/4 track seek is performed to the inner side in FIG. 9D, an integral output −V2 having minus polarity is obtained.

The integral outputs of FIGS. 9B to 9D are obtained by the integral operations (charging/discharging operations) on duty pulses generated from the read signals of the phase servo patterns in FIGS. 10A to 10E. FIG. 10A shows a portion of the first even-number field (EVEN 1) 68, and the cases where the read head 26 is subject to −1/4 track seek, on-track, +1/4 track seek are considered. At first, as for the No. 1 cylinder, as shown in FIG. 10B, a master clock having a reference phase is generated in synchronization with a read clock obtained from the read signal of the read head. FIG. 10C shows a duty pulse which is obtained in the state that the read head 26 is subject to −1/4 track seek. This duty pulse is ON at rising of the master clock, and is OFF by detection of a peak of servo patterns by means of the read head 26 or zero cross detection by means of integral. The duty pulse in −1/4 track seek has on-duty of 25% when a cycle of the master clock is 100%. FIG. 10D shows a duty pulse when the read head 26 is located on the track center and has on-duty of 50%. Further, FIG. 10E shows the case where the read head 26 is subject to +1/4 track seek, and the duty pulse in this case has on-duty of 75%. In the first even-number field 68 of FIG. 10A, the duty pulse of FIG. 10C, for example, has on-duty of 25%, but as shown in FIGS. 9A to 9D, in the odd-number field 74, since the phase of the phase servo patterns is opposite with respect to the track direction, the duty pulse has on-duty of 75% in the odd-number field 74. For this reason, with respect to the integral of the 25% duty pulse in FIG. 9B to the minus direction in the first even-number field 68, in the next odd-number field 74 the 75% duty pulse is obtained so that an inclination due to the integral to the plus direction is great. In the next second even-number field 80, an inclination is gentle by the integral of the 25% duty pulse, and finally the integral output V1 having plus polarity can be obtained. The 50% duty pulse in the on-track state of FIG. 10D has duty of 50% in all the three fields of FIGS. 9A to 9D, and thus the finally obtained integral output is zero volt. Further, the 75% duty pulse in the first even-number field in FIG. 10E becomes a 25% duty pulse in the next odd-number field 74 in FIGS. 9A to 9D, and thus an inclination to the plus direction is small in the odd-number field 68, and an integral output V2 having minus polarity is finally obtained at the great inclination due to the 75% duty pulse in the final second even-number field 80. As for a method of detecting the position signals of the heads using the phase servo patterns, the method which has been devised by the inventors of the present invention and disclosed in "Disk Apparatus" in Japanese Patent Application No. 6-8006 (1994) and in the specification and drawings of U.S. Pat. No. 5,694,265 (published on Dec. 2, 1997) can be used. Moreover, in recent years, the integral operations are not performed by the read signals of the phase servo patterns in the three areas shown in FIG. 7, and a single phase servo pattern such as only a phase servo pattern in the first even-number field 68 is recorded. Since a frequency (cycle) of this phase servo pattern is previously determined, the read signal of this phase servo pattern is subject to discrete Fourier transform so that a phase difference $\phi$ is directly obtained, and this is transformed into a head position signal. Such a method is considered.

With refernece to FIG. 6B again, FIG. 6B shows the structure of the gray code area 62 which continues from the position area 58 via the gap area 60. The gray code area 62 is an area where cylinder address information is coded, and a gray code bit is written thereinto with intervals of 10T. This gray code area is composed of a gray code mark 84, cylinder address infromation 86, head address information 88, sector address infromation 90, odd-number oparity bit 92 and dummy bit 94. The gray code mark 84 at the head represents a starting point of the gray code area. Cylinger addresses are coded in the cylinder address information 86, and a gray code bit is written thereinto with intervals of 10T. Similarly, respective address information is written into the following head address information 88 and sector address information 90 with gray code bit with intervals of 10T. Odd-parity bits which are generated from the head addresses and the servo sector addresses and are not gray-coded are written into the odd-number parity bit 92.

(Writing of Phase Servo Pattern by Phase Adjustment)

Figure 11:
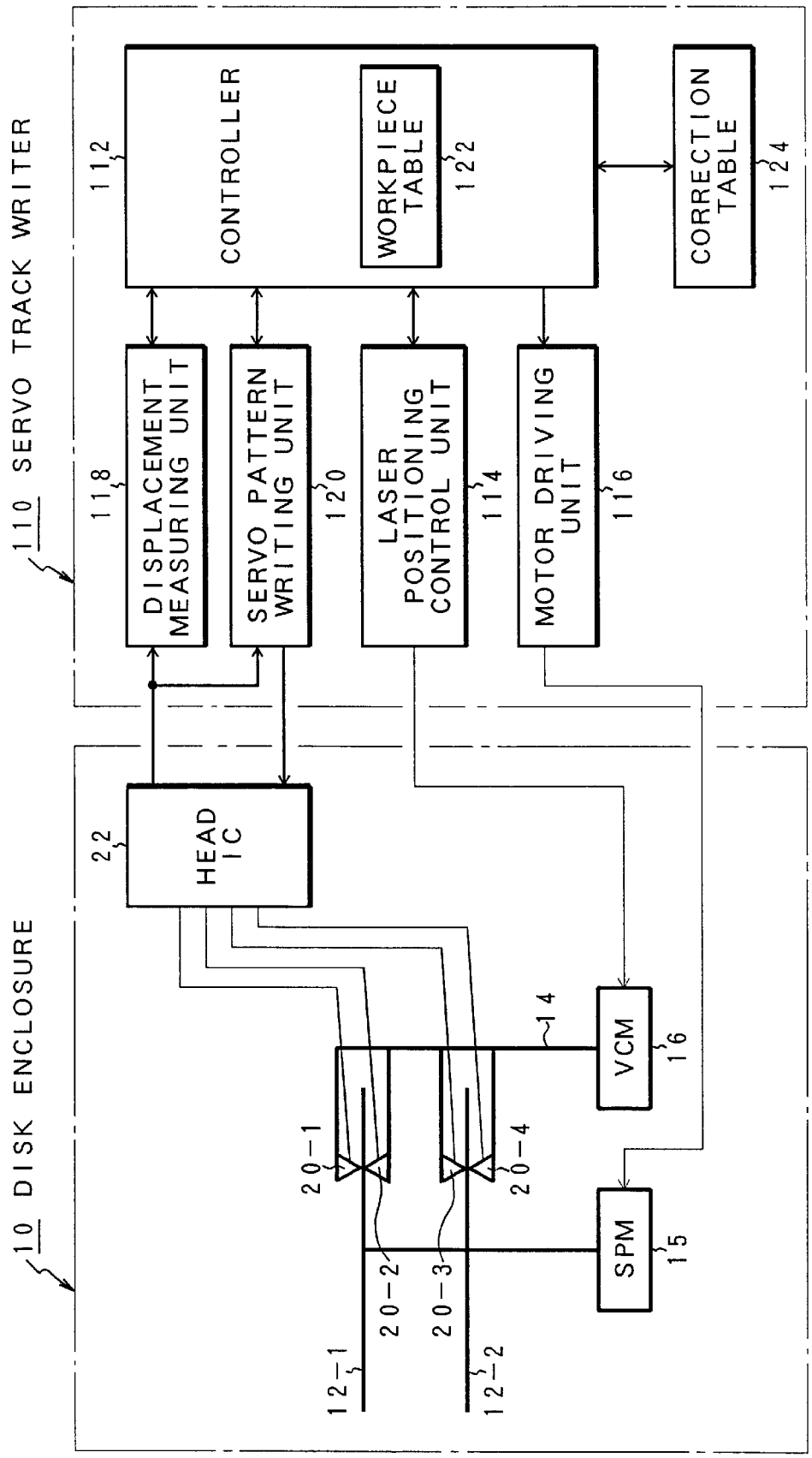
FIG. 11 is a block diagram showing a servo track writer for realizing a servo information writing method of the present invention as well as the disk enclosure.

FIG. 11 is an explanatory diagram for the servo track writer which carries the servo information writing method of the present invention, also shows the disk enclosure to which the servo information is written. In FIG. 11, at the manufacturing stage where the disk enclosure 10 of the hard disk drive is assembled, servo track formats are written into the magnetic disks by the servo track writer 110. The servo track writer 110 is composed of a controller 112, a laser locating control unit 114, a motor driving unit 116, a displacement measuring unit 118, a servo pattern write unit 120, a work table 122 and a correction table 124. Meanwhile, the disk enclosure 10 into which the servo track formats are written has the internal structure of the disk enclosure in FIG. 5, and the two magnetic disks 12-1 and 12-2 are mounted to a rotational axis of the spindle motor 15 in this embodiment. In this case, since the four data surfaces exist, the four combined heads 20-1 to 20-4 are provided to the rotary actuator 14 accordingly so as to be arranged on the data surfaces respectively. The rotary actuator 14 is driven by the VCM 16 and can locate the combined heads 20-1 to 204 in arbitrary positions on the data surfaces. When the servo track formats are written by the servo track writer 110, the head is located in such a manner that a position of the head is measured externally with high accuracy by a laser from the laser locating control unit 114. Moreover, the servo track formats are written onto the data surfaces by using the write heads provided respectively to the combined heads 20-1 to 20-4 of the rotary actuator 14 in the disk enclosure 10. Further, as for the basic method of writing the servo track formats, a reference clock is first written onto the data surfaces, and it is reproduced by the read heads and simultaneously the servo track formats are written in synchronization with rotation of the medium. Moreover, when the servo track formats are written by the servo track writer 110, a number of rotations of the spindle motor 15 may be set so as to be smaller than a number of actual rotations of the apparatus. For example, when the original number of rotations of the disk enclosure 10 is 10000 rpm, the servo track formats are written by the servo track writer 110 with a number of rotations of the spindle motor 15 is set to 7200 rpm by the motor driving unit 116.

Figure 1A:
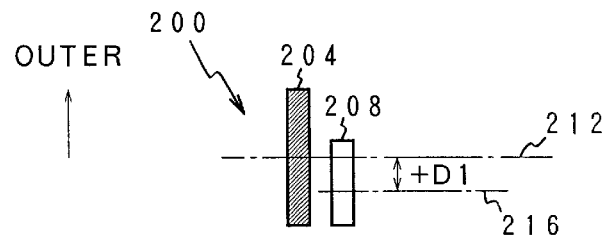
FIGS. 1A and 1B are explanatory diagrams showing displacement of write heads and read heads in two heads.
Figure 1B:
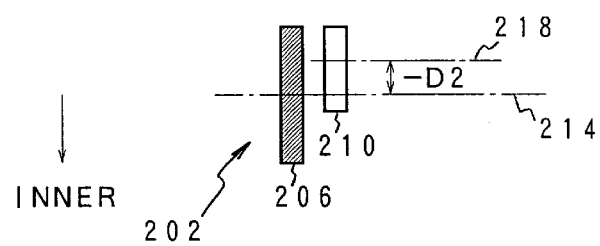
Figure 2A:
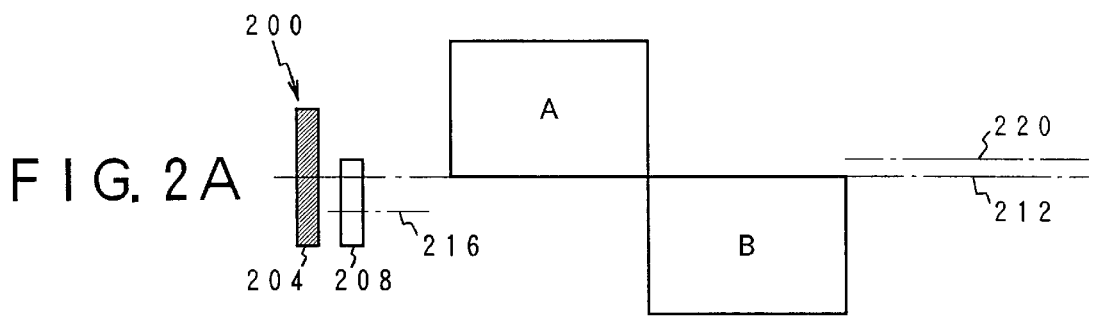
FIGS. 2A and 2B are explanatory diagrams showing displacement amounts with respect to track. centers obtained by reading servo patterns A and B, which are recorded on both sides of the track centers by the write heads alternatively by each write heads in FIGS. 1A and 1B, by the read heads.
Figure 2B:
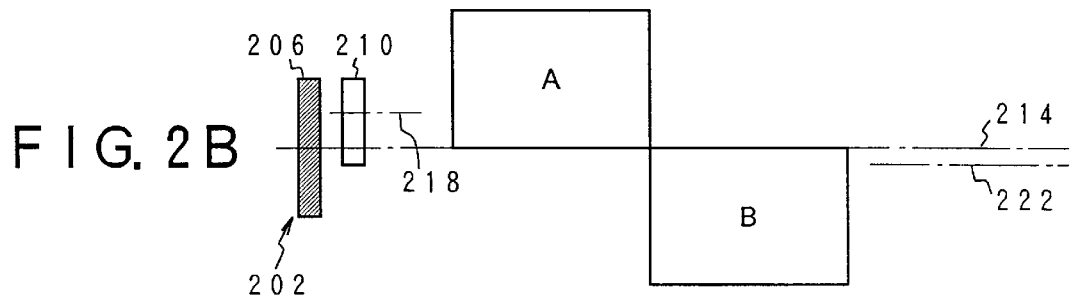
Figure 3:
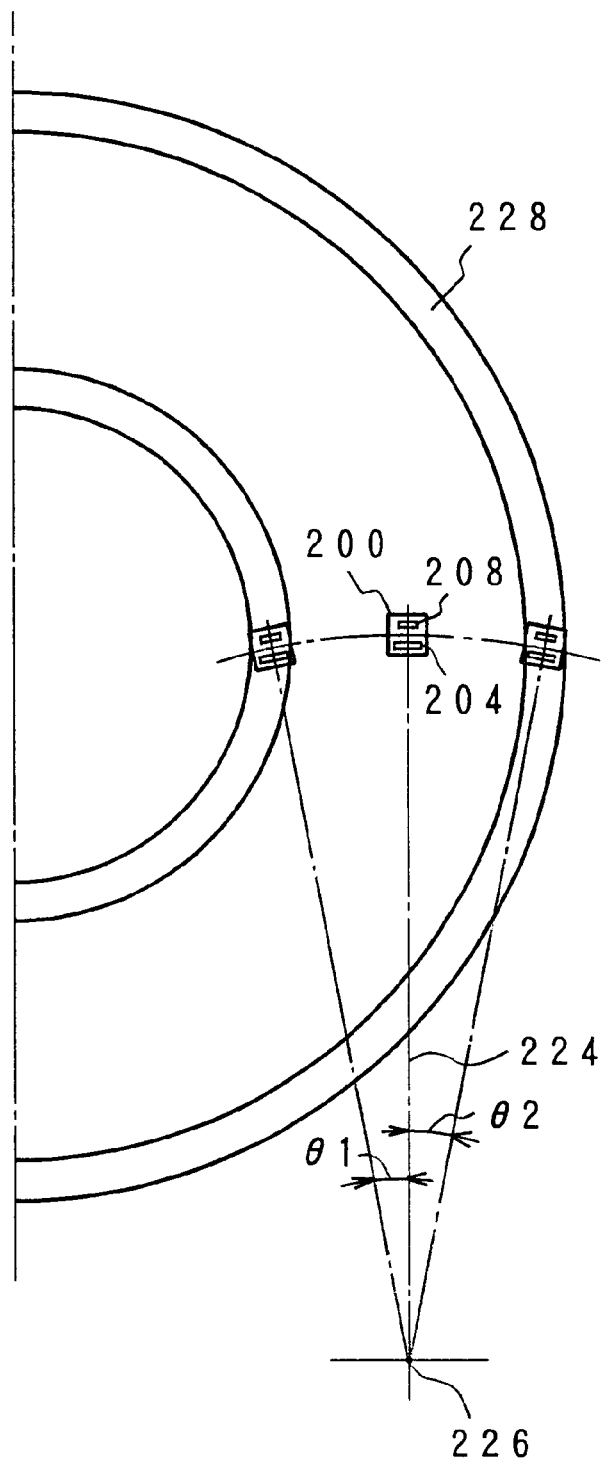
FIG. 3 is an explanatory diagram of a yaw angle offset in the case where the displacement amount changes according to cylinder positions.

As for the servo information writing process of the present invention by means of the servo track writer 110, displacement amounts D of the read heads with respect to the write heads are measured for the respective combined heads 20-1 to 204 and the cylinder positions on the data surfaces. The displacement amounts are measured by the displacement amount measuring unit 118. When the displacement amounts are measured, a burst pattern for measuring displacement, which is previously provided to the servo pattern write unit 120, is written into measurement tracks on the data surfaces, and the burst pattern is read so that its read signal is supplied to the displacement measuring unit 118. As a result, the displacement amounts of the read heads with respect to the write heads are measured. The displacement amounts D of the read heads with respect to the write heads are, as shown in FIG. 1, caused by physical displacement of the cores of the write heads and read heads and the offset of the yaw angle according to the cylinder positions by means of the rotary actuator shown in FIG. 3. Therefore, the displacement measuring unit 118 discretely determines measurement tracks in a plurality of places on the data surfaces of the disk media between the outer and inner sides, and measures displacement of the measurement tracks. The measured results by means of the displacement measuring unit 118 are stored in the work table 122, and are converted into information for phase adjustment so as to be stored in the correction table 124. Moreover, as for the positions of the cylinders other than the measuring cylinder, adjusted values which are obtained from a displacement amount measuring cylinder by interpolation is created so as to be stored in the correction table 124. When the phase information required for adjusting the phase of the phase servo patterns is obtained from the measured results by means of the displacement measuring unit 118 in such a manner, the phases of the phase servo patterns are adjusted so that relative shift amounts between the read heads are eliminated, and the servo information is written by the servo pattern write unit 120.

Figure 12:
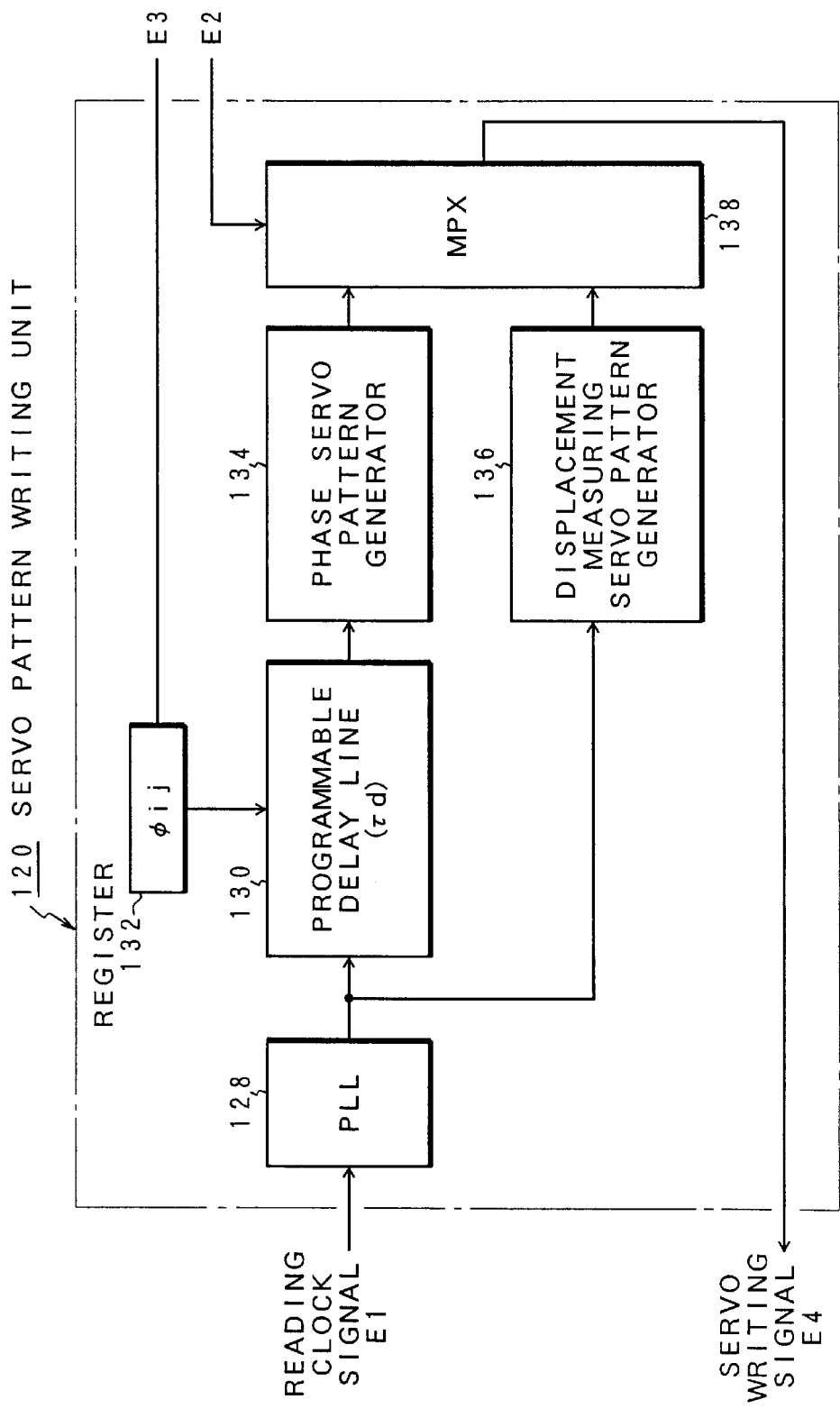
FIG. 12 is a block diagram of a write pattern generator in FIG. 11.

FIG. 12 is a block diagram of the servo pattern write unit 120 provided to the servo track writer 110 of FIG. 11. The servo pattern write unit 120 is composed of a PLL circuit 128, a programmable delay line 130, a register 132, a phase servo pattern generator 134, a displacement measuring servo pattern generator 136 and a multiplexer 138. The PLL circuit 128 generates a reference clock signal where clock synchronization is taken from a read clock signal E1 read from the medium when displacement is measured and the servo track format patterns are written. The programmable delay line 130 shifts time of the reference clock from the PLL 128 by delay time d according to an adjustment phase angle $\phi ij$ set in the register 132. For this reason, the phases of the phase servo patterns generated from the phase servo pattern generator 134 can be adjusted arbitrarily by the clock shift by means of the programmable delay line 130. The displacement measuring servo pattern generator 136 generates a simple burst pattern in order to measure physical displacement amounts of the read heads with respect to the write heads. The multiplexer 138 selects an output of the displacement measuring servo pattern generator 136 at the time of measuring displacement and selects an output from the phase servo pattern generator 134 at the time of writing the servo pattern by a switching signal from the controller 112 so as to supply them as a servo write signal E4 to the corresponding write head via the head IC 22 in the disk enclosure 10 of FIG. 11.

Here, with reference to FIGS. 13A and 13B, there will be explained below a principle for writing the phase servo patterns so that relative displacement amounts between the read heads of the present invention are eliminated. FIGS. 13A and 13B show the write heads 24-1 and 24-2 and the read heads 26-1 and 26-2 in the No.1 head 20-1 and the No. 2 head 20-2 provided in the disk enclosure 10 of FIG. 11, and the phase servo patterns which are written. At first, it is assumed that in the No. 1 head 20-1 of FIG. 13A a track center 142-1 of the read head 26-1 is displaced to the inner side, for example, by +D1 from a track center 140-1 of the write head 24-1. On the contrary, it is assumed that in the No. 2 head 20-2 of FIG. 13B a track center 142-2 of the read head 26-2 is displaced to the outer side by −D2 from a track center 140-2 of the write head 24-2. Here, the phases of the phase servo patterns are adjusted on a basis of the read head 26-1 in the No. 1 head 20-1 so that a relative displacement amount of the read head 26-2 of the No. 2 head 20-2 is eliminated. As for the read head 26-1 to be reference, the phase servo patterns written by the write head 24-1 are written onto a range of 90° while they are being displaced by steps of 30° with respect to 1/3 cylinder feed reference phase. Here, when a relative displacement amount of the read head 26-2 on the basis of the read head 26-1 is α2, $$\alpha 2 = -D2 - D1.$$

This relative displacement amount α2 is converted into a phase angle φ2 of the phase servo pattern, and the phases of the servo patterns of the No.2 head 20-2 shifts by the phase angle φ2 to a direction of 6-phase delays with respect to the servo patterns of the No. 1 head 20-1 so that a phase servo patterns 144-2 are written. For example, when the relative displacement amount α2 of the read head 26-2 with respect to the read head 26-1 is 1/3 track pitch, the adjustment phase angle φ2 is 30°. Therefore, the phases of the servo patterns 144-2 of the. No. 2 head 20-2 are shifted to a direction of 30° delay as shown in the drawing with respect to the phase servo patterns 144-1 of the No. 1 head 20-1 so as to be written. As a result, the position information, which is obtained when the phase servo patterns 144-2 whose phases were adjusted are read by the read head 26-2, is the same as that of the position signals which are obtained when the reference phase servo patterns 144-1 are read by the read head 26-1.

Figure 14:
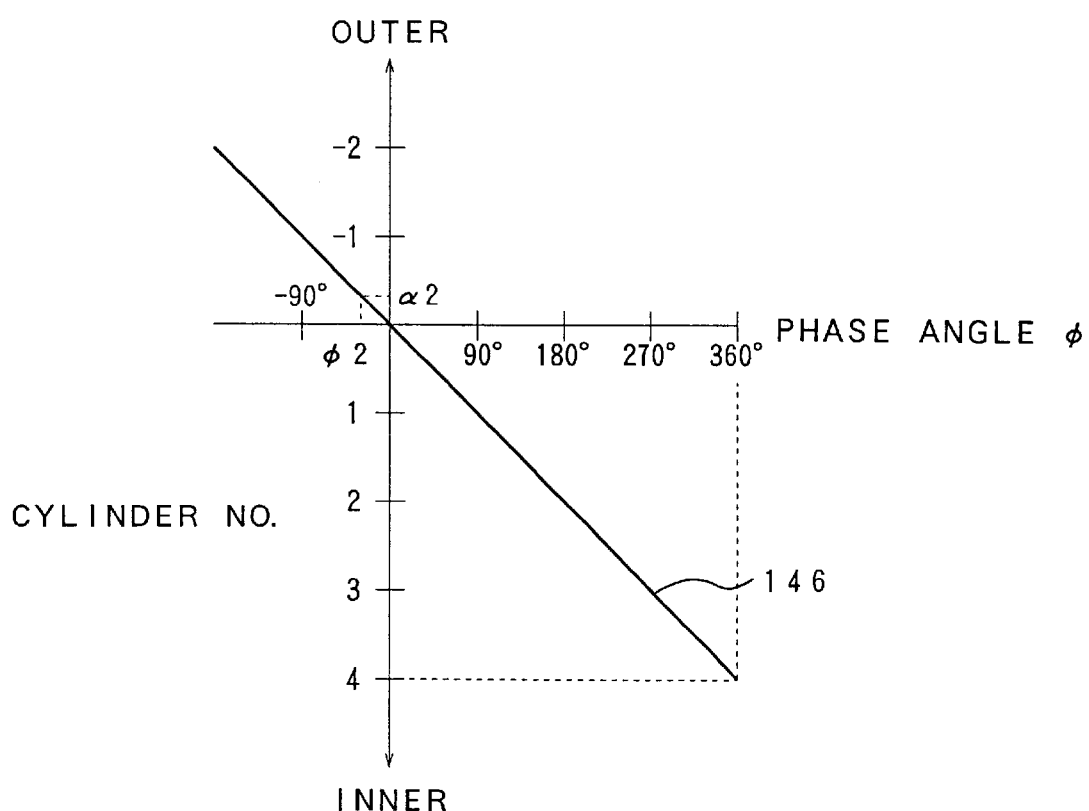
FIG. 14 is a corresponding characteristic chart of a head position and a phase angle of the phase servo pattern where a unit of cylinder is 1.

In FIG. 14, a characteristic of the phase angle φ of the phase servo patterns with respect to the position of the cylinder direction in FIGS. 13A and 13B is represented by a straight line 146. This characteristic line 146 shows the characteristic of the phase servo patterns of the reference read head 26-1. With respect to this characteristic, the read head 26-2 of the No. 2 head 20-2 is displaced relatively by α2 to the outer side. Therefore, the phase angle φ2 for phase adjustment corresponding to the relative displacement amount α2 can be obtained from the characteristic line 146. Here, as for the characteristic line 146, when a number of cylinders (N) for the phase servo pattern is 4 and the cylinder position is CL and the phase angle is φ, the following relationship holds:

$$CL = (4/360°)\phi.$$

When the relative displacement amount a is used instead of the cylinder position CL, $$\alpha = (4/360°)\phi.$$

Therefore, in order to obtain the adjustment phase angle φ from the relative displacement amount α, $$\phi = 90° \times \alpha.$$

For example in FIGS. 13A and 13B, since the relative displacement amount α2 of the read head 26-2 provided in the No. 2 head 20-2 with respect to the read head 26-1 of the NO. 1 head 20-1 is, for example, is 30°, the adjustment phase angle φ2=30° can be obtained.

Figure 15:
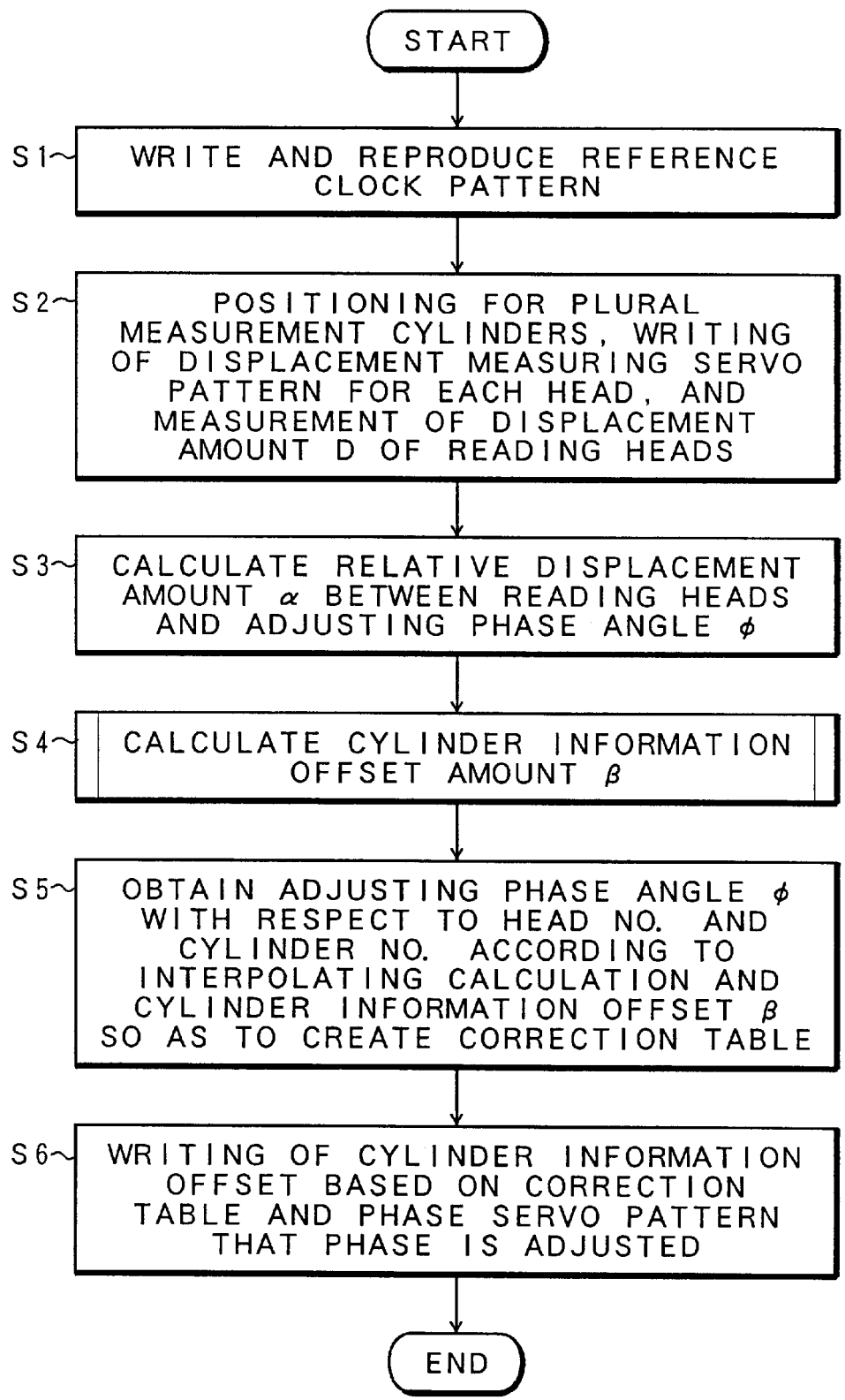
FIG. 15 is a flowchart of a processing procedure of the servo information writing method according to the present invention.

FIG. 15 is a flowchart showing the servo track format writing process by means of the servo track writer 110 of FIG. 11. In FIG. 15, the reference clock pattern is written onto the data surface of the magnetic disk being subject to writing so as to be reproduced at step S1. The write heads provided in the disk enclosure 10 of FIG. 11 may be used for the writing of the reference clock pattern, but an exclusive use read head provided in the servo track writer 110 side is used for reproduction of the reference clock pattern, and it is preferable that the reference clock can be reproduced fixedly. Next, the displacement measuring unit 118 is operated at step S2, and while the heads are being located in a predetermined plurality of measuring cylinders, displacement measuring servo patterns are written respectively for the heads at every time of switching the heads. The displacement measuring servo patterns are read out before writing so that the displacement amounts D of the read heads with respect to the write heads are measured. At this time, the multiplexer 138 is switched into the displacement measuring servo pattern generator 136 by a switching signal E2 for the servo pattern write unit 120 of FIG. 12, and the displacement measuring servo write signal E4 is used so that the burst pattern of FIG. 16, for example, is written into the measuring cylinders.

Here, with reference to FIGS. 16A and 16B again, there will be explained below the measurement of the displacement of the read heads with respect to the write heads. FIG. 16A shows the writing of displacement measuring servo patterns A and B into the measuring cylinder by means of the write head 24. At this time, it is assumed that the read head 26 is displaced by D to the inner side with respect to the write head 24. Moreover, a position of the track center when the servo patterns A and B are written by the write head 24 is POS1. As shown in FIG. 16B, the servo patterns A and B are read by the read head 26. FIG. 16B shows the position of the read head 26 where the servo patterns A and B are read by the read head 26 and their read signals are equal to each other. The position of the read head 26 at this time is POS2. As shown on the right side of FIG. 16B, the position where the read signals of the servo patterns A and B are equal to each other is a position where a difference between a read signal $V_A$ of the servo pattern A and a read signal $V_B$ of the servo pattern B ($V_A - V_B$), which is obtained when the read head 26 moves to a direction of crossing the track, becomes zero. When the track center position POS2, where the read signals of the servo patterns A and B by the read head 26 at the time of reading are equal to each other, is detected, the displacement amount D of the read head 26 with respect to the write head 24 can be obtained according to the following equation:

$$D = POS2 - POS1.$$

As a result, for example, a displacement amount D1 of the read head 26-1 with respect to the write head 24-1 in the No.

1 head 20-1 of FIG. 13A can be detected. The displacement amounts D of the read heads with respect to the write heads measured in such a manner are stored in the work table 122 as shown in FIG. 17. The work table 122 stores the displacement amounts D correspondingly to the head numbers HH and the measuring cylinder numbers SC as addresses. In this embodiment, since the four combined heads exist, 1 to 4 are set as the head numbers HH. Moreover, SC1 to SCn are set as the measuring cylinder numbers SC for n-numbered cylinders. For example, in the case where a number of cylinders for each data surface is 2000, eighteen measuring cylinders may be set with intervals of 250 cylinders for number 0 on the outer side to the number 2000 on the inner side.

With reference to FIG. 15 again, when the displacement amounts D of the read heads with respect to the write heads in all the cylinder positions of all the heads can be measured at step S2, relative displacement amounts α between another read heads on the basis of a specified read head, and adjustment phase angles φ based on the relative displacement amounts a are calculated at step S3.

For example, in the case of the head whose number HH is 1 in the work table 122 of FIG. 17, the relative displacement amount is obtained according to the following equation:

$$aij = Dij.$$

(Here, i is a head number and j is a cylinder number.) In this case, since the relative displacement amounts a11 to a1n in the No. 1 head are references, all of them are zero. When the relative displacement amounts a are obtained in such a manner, the adjustment phase angles φ are calculated according to the characteristic line 146 of FIG. 14 as follows:

$$\phi = 90° \times \alpha.$$

In this case, since the No. 1 head is a reference head, all the phase angles φ11 to φ1n are 0°.

With reference to FIG. 15 again, the cylinder information offset amounts β are calculated at next step S4. In the servo information writing of the present invention, the cylinder information offset amounts β adjust writing phases of the phase servo patterns so that displacement of the read heads is substantially eliminated. For this reason, cylinder information using simple burst pattern or the like, namely, patterns other than the phase servo patterns in the first even-number field 68, the odd-number field 74 and the second even-number field 80 in the servo frame of FIGS. 6A and 6B are influenced directly by the displacement of the read heads with respect to the write heads. For this reason, when the displace amounts of the read heads with respect to the write heads become larger, the read head overlaps on the burst pattern of the cylinder information in the adjacent track, and thus misreading of the cylinder information possibly occurs. Therefore, in the present invention, the cylinder information offset amounts β are calculated at step S4 based on the displacement amounts D of the read heads with respect to the write heads measured at step S2. The write heads are offset by the cylinder information offset amounts β at the timing of writing the cylinder information in the servo track formats so that the cylinder information is written. In this case, as the cylinder information offset amounts β, the measured displacement amounts D are not directly used, but values, which are obtained by converting feeding amount in a direction directly facing the track at the time of writing the phase servo pattern as one unit, are used.

Figure 18:
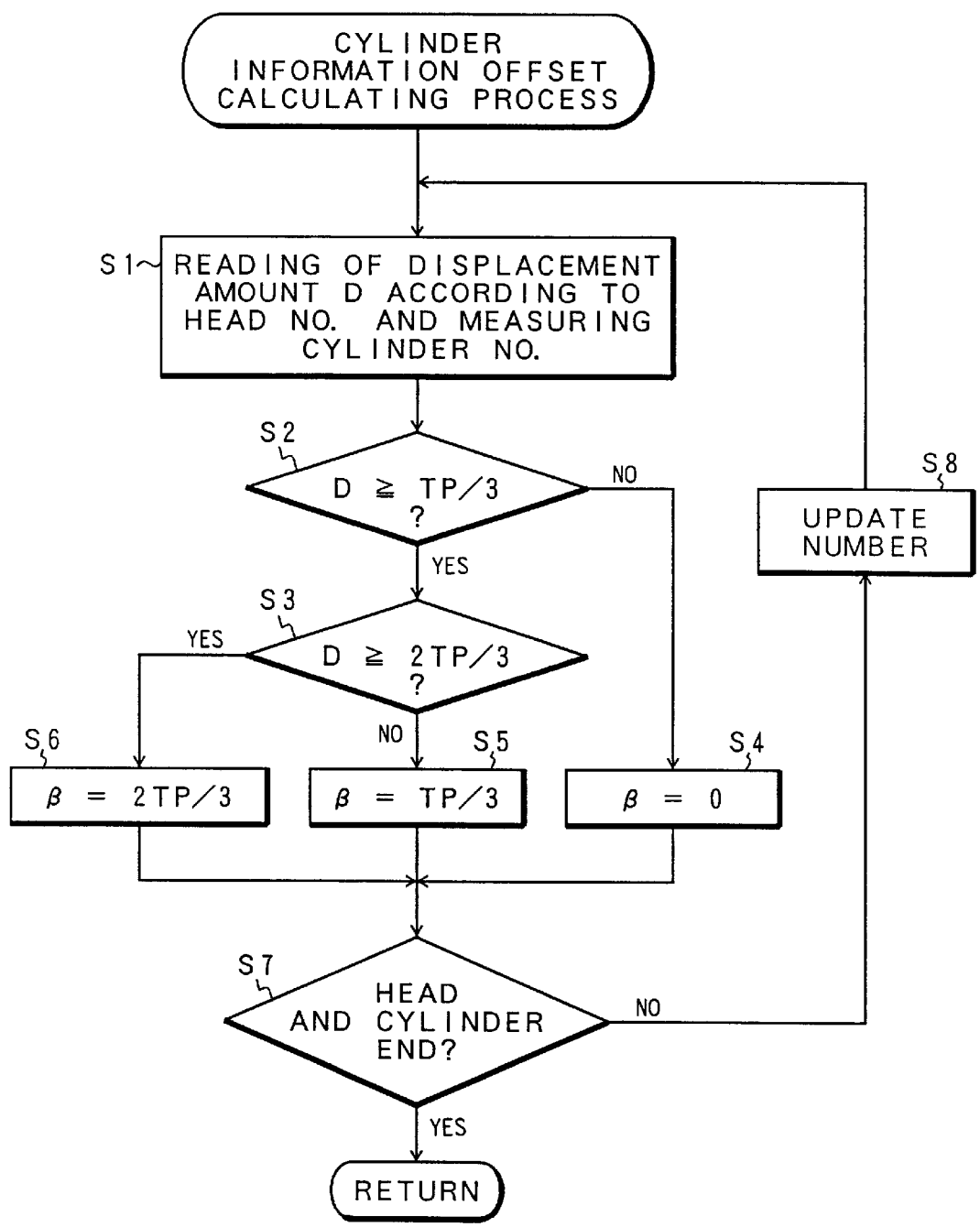
FIG. 18 is a flowchart of a process for offsetting cylinder information stored in the work table of FIG. 17.

FIG. 18 shows details of the process for calculating the cylinder information offset amounts β at step S4 of FIG. 15. At first, the displacement amount D corresponding to the head number and measuring cylinder number is read out from the work table 122 of FIG. 17 at step S1. The displacement amount D is compared with a feeding amount of the predetermined phase servo pattern in one cylinder, namely, TP/3 in this embodiment at step S2. When the displacement amount D is less than TP/3, the cylinder offset amount β is 0. When the displacement amount D is at least TP/3, it is compared with 2TP/3 at step S3, and when smaller than 2TP/3, the offset amount β is determined as TP/3 at step S5. When the displacement amount D is at least 2TP/3 at step S3, the offset amount β is determined as 2TP/3 at step S6. The processes at steps S1 to S6 are repeated while the head number and the measuring cylinder number are being updated at step S8 until the processes on all the heads and all the cylinders are completed at step S7. According to the cylinder information offset calculating process, the cylinder information offset β shown in the work table 122 of FIG. 17 can be obtained.

With reference to FIG. 15 again, when the calculation of the cylinder information offset amounts β is ended at step S4, the adjustment phase φ and the cylinder information offset β corresponding to the head number HH and the cylinder number CC to be stored in the correction table 124 of FIG. 19 are obtained by linear interpolation of respective values of the measuring cylinders obtained in the work table 122 of FIG. 17 at step S5. The adjustment phases φ and the cylinder information offsets β which are obtained for all the cylinder numbers in all the heads are stored. With the above process, preparation for writing the phase servo patterns is completed, and finally the servo track formats are written by writing the offset cylinder information and writing the phase servo patterns whose phases have been adjusted based on the correction table at step S6.

FIGS. 20A and 20B show a relationship between the cylinder information which is written based on the cylinder information offsets β in the correction table 124 of FIG. 19 and the phase servo position information. FIG. 20A shows writing states of five cylinders on the tracks No. i−2, i−1, i, i+1 and i+2 from the outer side to the inner side. On the tracks No. i−2, i−1, the cylinder information offsets β are zero, and on the tracks No. i and after, the cylinder offsets β are TP/3. For this reason, on the tracks No. up to i−1, the cylinder information 148 and the phase servo position information 150 are written on the same track, but on the track No. i where B=TP/3, the width in the track direction of the cylinder information 148 and 152 is enlarged to 4TP/3, and on the next track No. i+1, the width is returned to the original width. Similarly, FIG. 20B shows servo pattern writing states of five cylinders on the track No. j−2, j−1, j, j+1 and J+2 from the outer side to the inner side. In this case, on the track No. j, the cylinder information offset β is −TP/3. For this reason, the track width of the cylinder information 148 on the track No. j is reduced to 2TP/3, and on the next track No. j+1, the track width is returned to original TP. When the cylinder information as the burst pattern according to the displacement amount D of the read heads with respect to the write heads according to the cylinder positions is offset, misreading of the cylinder information due to overlapping on the cylinder information in an adjacent cylinder in the read head can be prevented securely. Here, in the case where the adjustment phase angles φ read from the correction table 124 of FIG. 19 are set in the register 132, since 360° which is 1 cycle of the phase servo patterns is 8T, the delay time τd to be set in the programmable delay line 130 according to the adjustment phase angles φ is determined by the following equation:

$$\tau d = (8T/360°)\phi.$$

In this embodiment, the adjustment phase angles φ are stored in the correction table 124 of FIG. 19, but the delay time τd calculated according to the above equation may be stored in the correction table 124. Moreover, as phase adjustment at the time of writing the phase servo patterns for eliminating relative displacement amounts between the read heads by means of the servo track writer 110 of FIG. 11, phase adjustment for absolute displacement correction may be performed so that the track centers of the write heads coincide with the track center of the read heads provided in the combined heads. In order to performs this adjustment, the displacement amounts D of the read heads with respective to the write heads in the heads obtained in the work table 122 of FIG. 17 may be directly converted into the adjustment phase angles φ. With the writing of the phase servo patterns using the adjustment phase angles φ directly corresponding to the displacement amounts D, position signals, which are equivalent to that the read heads are located on the track centers in the heads at the time of writing, can be obtained. As a result, the displacement between the read heads at the time of switching the heads can be substantially eliminated.

(Writing of Phase Servo Pattern Subject to Offset Seek at the time of Switching Heads)

Figure 21:
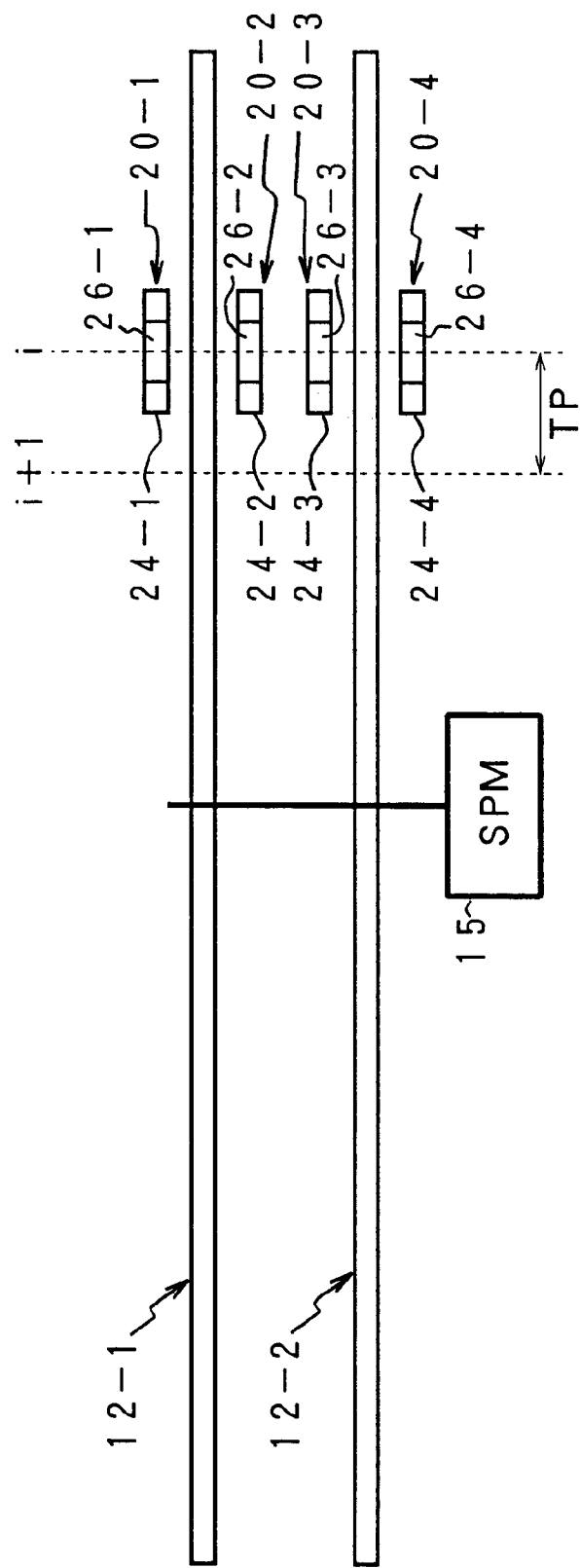
FIG. 21 is an explanatory diagram showing an access operation including head switching and cylinder switching.

FIG. 21 shows an arrangement state of the heads with respect to the magnetic disk medium in the disk enclosure 10 of FIG. 5. Namely, the four combined heads 20-1 to 20-4 which are located by a rotary actuator are arranged on the data surfaces of the two magnetic disks 12-1 and 12-2 which are overlapped to be arranged on a rotary axis of the spindle motor 15. The combined heads 20-1 to 204 are arranged so that the write heads 24-1 to 24-4 with wide core width are integral with the read heads 26-1 to 26-4 with narrow core width. Here, the phase servo patterns according to the servo track format of FIG. 6 are written onto the data surfaces of the magnetic disks 12-1 and 12-2. Moreover, the combined heads 20-1 to 20-4 are located in the No. i cylinder, and the adjacent No. i+1 cylinder exists on the inner side. The hard disk drive shown in FIG. 4 is sequentially accessed by the host computer in order to read or write continuous logic block occasionally. In the case, for example, where the writing onto the No. i cylinder and the No. i+1 cylinder is performed continuously, the sequential access from the host is performed by the following procedure:

(I) in a state that the heads are sought in the No. 1 cylinder and are on-tracked, the heads 20-1 to 20-4 are switched in an order of the head numbers and simultaneously access for 1 cylinder is performed;

(II) when the head is switched into the final head 20-4 and the access for 1 cylinder is ended, 1 track seek for moving the head to the next No. i+1 cylinder is performed; and (III) in an on-track state on the No. i+1 cylinder by the completion of the 1 track seek, the heads 20-1 to 20-4 are switched in the order of the head numbers and simultaneously access for each cylinder is repeated.

In the operation of the hard disk drive for the sequential access from the host, every time when writing is ended by switching the head for 1 cylinder, 1-track seek for moving the head to the next cylinder should be performed. The 1-track seek has a command form such that a 1-track seek command is originated from a seek command originating unit, and a seek command executing unit receives the 1-track seek command and 1-track seek is performed. For this reason, in order to execute the 1-track seek command, the following command sequence:

I) originating of the 1-seek command;

II) execution of the 1-seek command; and

III) post of normal end of the 1-seek command, is required, and for this time the reading or writing from/onto the magnetic disks is interrupted and thus time for all the accesses becomes longer. Therefore, in the present invention, the phases of the phase servo patterns written onto the data surfaces of the heads in the same cylinder position are adjusted, and position signals, which are obtained from the phase servo patterns every time when the heads are switched in the same cylinder position, are displaced. As a result, after the head is switched into the final head, the head can be moved to the next cylinder not by the 1-track seek command but by simple offset seek. For this reason, a moving distance Dh is obtained by dividing 1-track pitch between the No. i cylinder and the next No. i+1 cylinder, for example, in FIG. 21 by a number M of the combined heads 20-1 to 20-4 as follows:

$$Dh = 1/M.$$

In the case of FIG. 21, since the number of heads M is four, the moving distance Dh becomes 1/4 track pitch. The moving distance Dh for each head switching which is 1/4 track pitch is converted into the adjustment phase angle φ of the phase servo pattern. When the phase servo patterns are written by the servo track writer 110 shown in FIG. 11, the phases are delayed by the phase angle φ corresponding to the moving distance Dh at every time of head switching so that the phase servo patterns are written. Here, the moving distance Dh which is shifted by head switching is converted into the phase angle φ for adjusting the phase servo patterns according to the following equation:

$$\phi = (360°/N)Dh = (360°/N) \cdot (1/M).$$

More concretely, since one cycle of the phase servo patterns, namely, a number of cylinders corresponding to 360° N, is four and a number of the heads M is four, the adjustment phase angle φ at the time of head switching is 22.5°.

Figure 22:
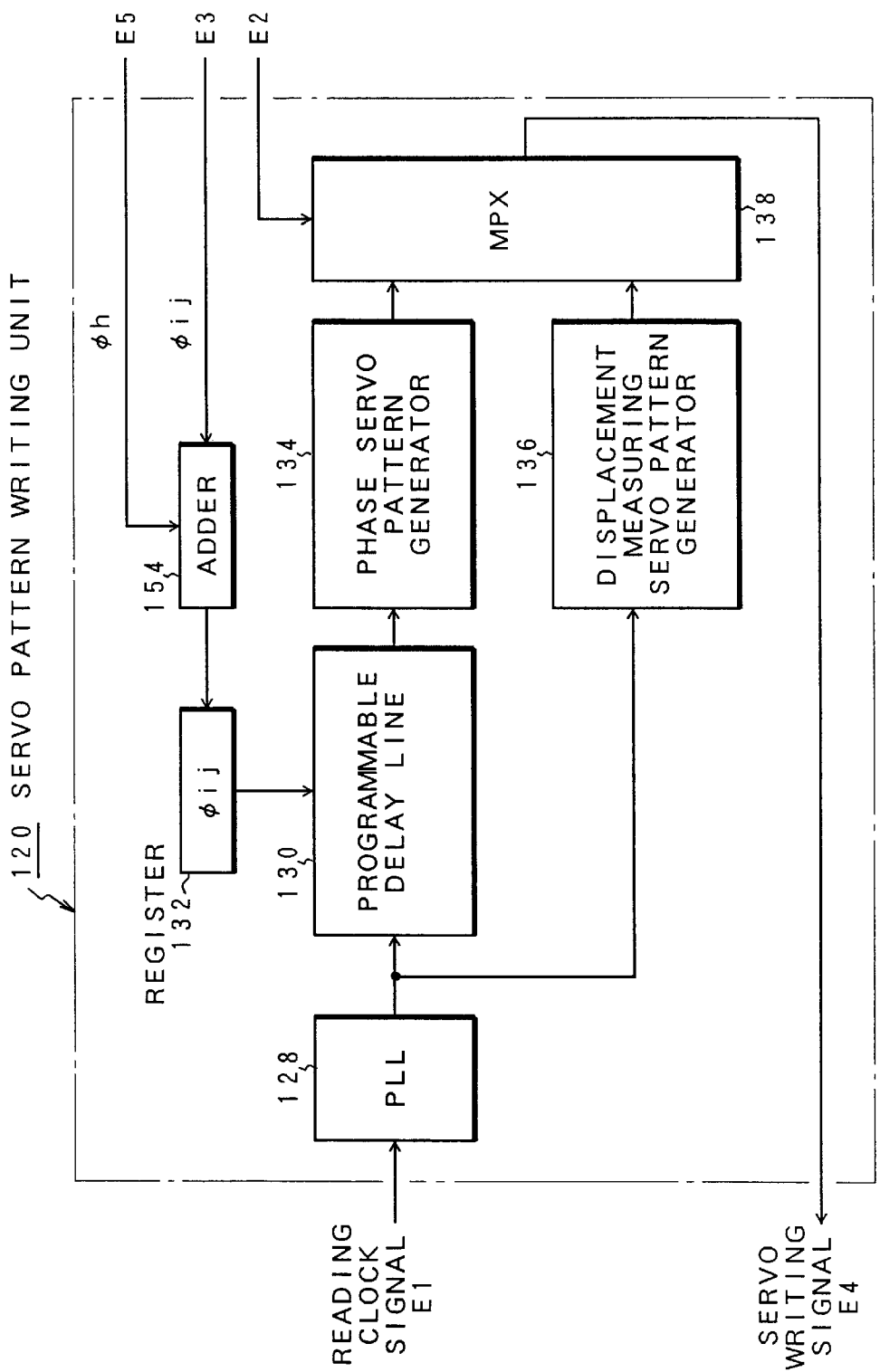
FIG. 22 is a block diagram showing another embodiment of a servo pattern write section in FIG. 11 where the phase servo pattern which is offset-sought due to the head switching is written.

FIG. 22 is a block diagram showing the servo pattern write unit 120 provided in the servo track writer 110 of FIG. 11 for writing the phase servo patterns whose phases are adjusted so that the position signals by means of the head switching are delayed by 1/4 track pitch. The servo pattern write unit 120 is provided with an adder 154 at a stage before the register 132 for setting delay time τd of the programmable delay line 130. The adder 154 adds an adjustment phase angle φh for obtaining displacement of 1/4 track pitch for every head switching to an adjustment phase angle φij read from the correction table 124 of FIG. 19 correspondingly to the head number and the cylinder number. Namely, in the No. 1 head, the adjustment phase angle φij for eliminating displacement between the read heads is directly set to the register 132, and the addition is performed so that displacement of 1/4 track pitch caused forcibly every time when the head is switched to the No. 2 head, the No. 3 head and the No. 4 head. Namely, the added outputs of the adder 154 become as follows:

No. 1 head: φij=φij

No. 2 head: φij=φij+φh

No. 3 head: $\phi ij=\phi ij+2\phi h$

No. 4 head: $\phi ij=\phi ij+3\phi h$.

Figure 23A:
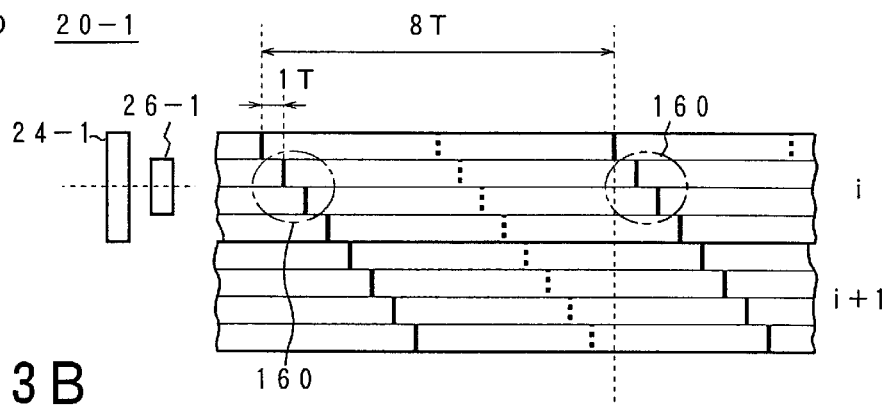
FIGS. 23A to 23D are explanatory diagrams of the phase servo patterns where the phases are adjusted for the respective head where position signals are offset by head switching.
Figure 23B:
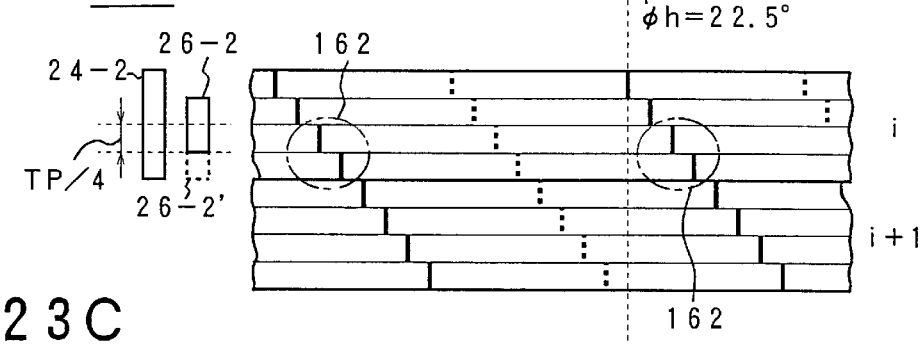
Figure 23C:
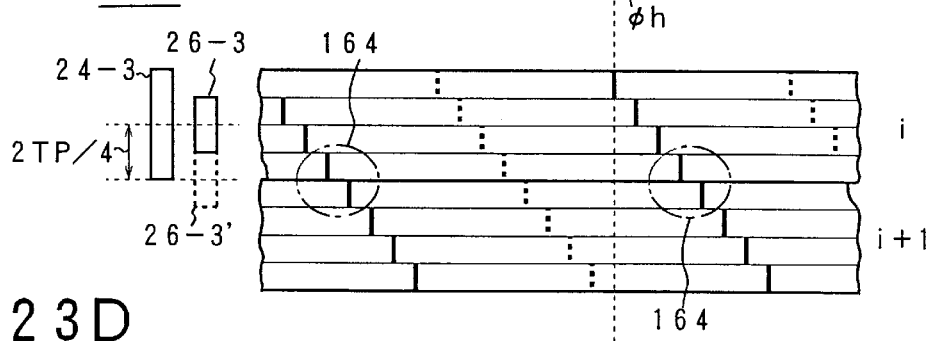
Figure 23D:
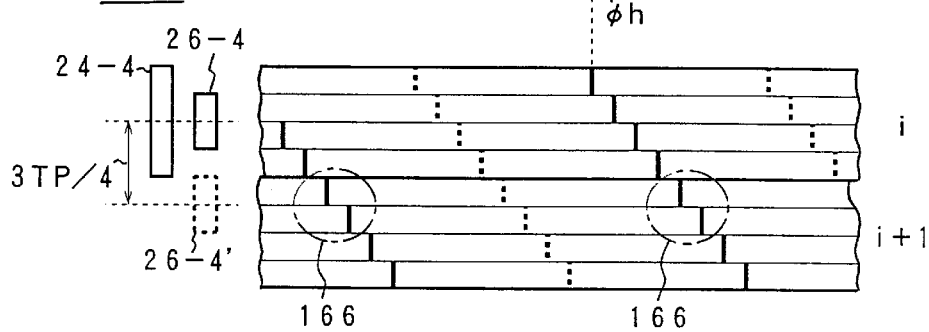

FIGS. 23A to 23D show states that the phase servo patterns whose phases are adjusted are written in the No. i cylinder and the No. i+1 cylinder of FIG. 21 by the servo pattern write unit 120 of FIG. 22. Here, for simple explanation, the displacement amounts of the read heads with respect to the write heads are zero. FIG. 23A shows the phase servo patterns of the No. 1 head 20-1, and the phase servo patterns are recorded repeatedly in a state that one cycle 8T in the track direction is 360°. Moreover, in this embodiment, the feeding amount to a direction intersecting perpendicularly to the track according to the head switching is 1/4 track pitch, and the phase angle φ corresponding to the feeding amount is 22.5°. In the No. 1 head 20-1, the adjustment phase angle φh is 0, and the phase servo patterns are recorded based on a reference clock obtained from a read clock of the disk medium. Here, when the read head 26-1 is positioned on the track center in the cylinder No. 1, it reads two phase servo patterns 160, and the position signals which are obtained by reading the phase servo patterns 160 represent the track center of the No. 1 cylinder. FIG. 23B shows the phase servo patterns of No. 2 head 20-2. When the phase servo patterns of the No. 2 head 20-2 are recorded, the phases are advanced by the adjustment phase angle φh of 22.5° with respect to phase servo patterns of the No. 1 head in FIG. 23A so that read signals of the two phase servo patterns 162 in the position of a read head 26-2' which is offset to the inner side by TP/4 from the read head 26-2 become position signals showing the track center. Moreover, on the No. 3 head 20-3 of FIG. 23C, the phase servo patterns, whose phases are advanced by the adjustment phase angle φh of 22.5° with respect to the one-previous head, are written. For this reason, in the No. 3 head 20-3, the read signals of the two phase servo patterns 164 in the position of a read head 26-3' offset by 2/4 track pitch to the inner side from the read head 26-3 become position signals showing the track center. Further, on the No. 4 head 20-4 of FIG. 23D, the phase servo patterns, whose phases are advanced by the adjustment phase angle φh of 22.5° with respect to the one previous head, are written. For this reason, on the No. 4 head 20-3, the read signals of the two phase servo patterns 166 in the position of a read head 26-4' offset by 3/4 track pitch to the inner side from the read head 26-4 become the position signals showing the track center.

Figure 24A:
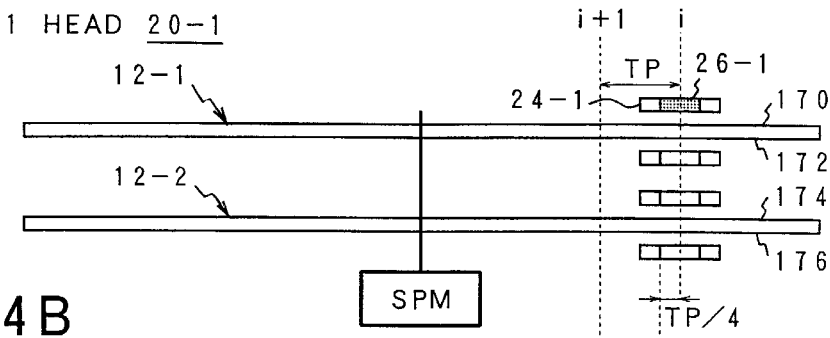
FIGS. 24A to 24E are explanatory diagrams of the head switching and the offset seek using the phase servo patterns of FIGS. 23A to 23D.
Figure 24B:
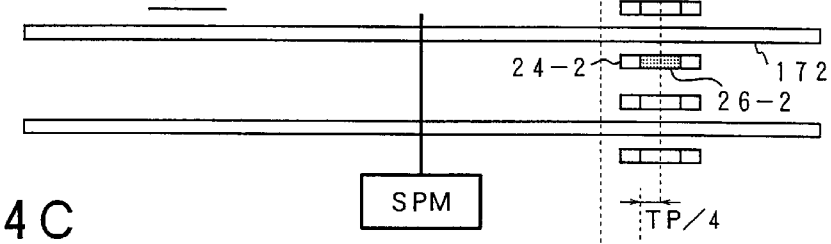
Figure 24C:
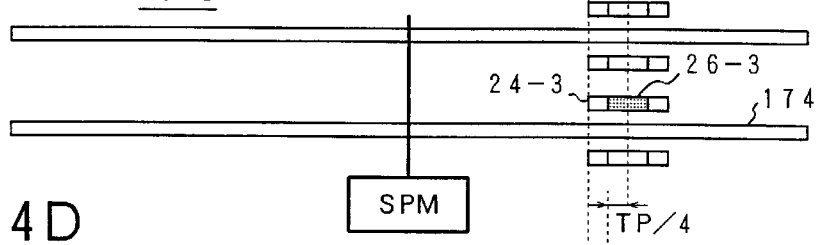
Figure 24D:
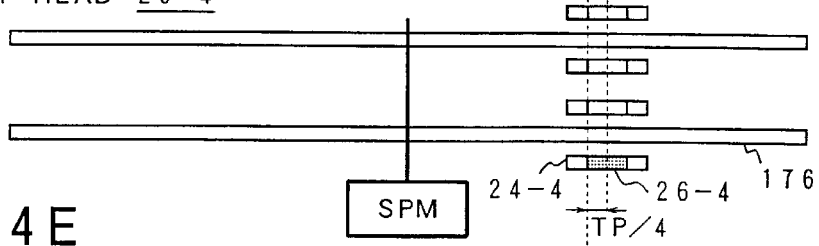
Figure 24E:
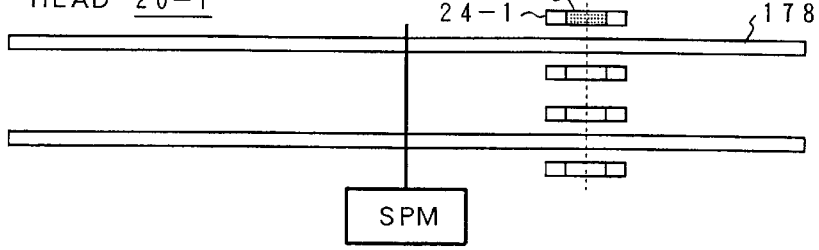

FIGS. 24A to 24E are explanatory diagrams for head switching according to the sequential access from the host in the case using the phase servo patterns which are written as shown in FIG. 22 and from which position signals shifted by 1/4 track pitch at the time of every head switching are obtained. At first, FIG. 24A shows the case where the head is brought into an on-track control state after the head is sought on the target No. 1 cylinder and in this state the No. 1 head 20-1 is selected. The phase servo patterns of the No. i cylinder in FIG. 23A are read by the read head 26-1 of the No. 1 head 20-1, and the position signals at this time show the track center of the cylinder i. In this state, when the writing of data for 1 cylinder by means of the write head 24-1, for example, in the No. i cylinder of a data surface 170 is ended, as shown in FIG. 24B, the select state of the No. 2 head 20-2 is switched. When the read head 26-2 of the No. 2 head 20-2 reads the servo patterns of FIG. 23B, the position of the head is such that the track center is offset by 1/4 track pitch to the inner side. For this reason, the No. 2 head 20-2 is located on the track center which is offset by 1/4 track pitch to the inner side due to the offset seek, namely, is brought into the on-track state. The offset seek in this case does not require originating and execution of a command like 1-track seek, and the No. 2 head 20-2 can be located on the track center which is shifted by 1/4 track pitch to the inner side in an offset seek operation of the on-track servo system on the seek command executing unit side, more concretely in the servo controller 38 of FIG. 4. In the on-track control state of the read head 26-2 on the track center offset by 1/4 track pitch to the inner side from the No. 1 cylinder, data for 1 cylinder are written onto the data surface 172 by the read head 24-2. Thereafter, the head is switched into the No. 3 head 20-3 of FIG. 24C and into the No. 4 head 24-4 of FIG. 24D similarly. With the switching into the No. 4 head 24-4, the writing onto the data surfaces 170, 172, 174 and 176 corresponding to the No. i cylinder for 4 cylinder is ended, and the cylinder is switched into the No. i+1 cylinder. At the time of switching into the No. i+1 cylinder, as shown in FIG. 24E, the heads are offset-sought by 1/4 track pitch to the inner side from the switching state of the final No. 4 head 24-4 of FIG. 24D so as to be located on the track. For this reason, according to the phase servo patterns of FIG. 23, as the head locating operation by means of the sequential access from the host for switching the cylinders and heads, the offset seek for 1/4 track pitch is simply repeated, and thus the command sequence for originating and executing 1-track seek command required for switching conventional cylinders is not necessary. As a result, the whole access time can be reduced sufficiently.

FIGS. 25A to 25D show writing states of the phase servo patterns of FIGS. 23A to 23D and data writing states using these phase servo patterns. In the No. 1 head 20-1 of FIG. 25A, phase servos 180-1 and data 182-1 are also written at the same track center. In the No. 2 head 20-2 of FIG. 25B, the track center of the phase servos 180-2 is the same as that of the No. 1 head 20-1, but data 182-2 are offset by TP/4 to the inner side so as to be written. Moreover, the track center of phase servos 180-3 of the No. 3 head 20-3 in FIG. 25C is the same as that of the No. 1 head 20-1, but data 182-3 are offset by 2TP/4 to the inner side so as to be written. The track center of phase servos 180-4 of the No. 4 head 20-4 in FIG. 25A is the same as that of the No. 1 head 20-1, but data 182-4 are offset by 3TP/4 to the inner side from the No. 1 head 20-1 so as to be written.

Here, in the servo pattern write unit 120 of FIG. 22, the adjustment phase angle φij for eliminating displacement between the read heads obtained from the correction table 124 of FIG. 19 is added to the adjustment phase angle φh for offset seek according to the head switching at the time of cylinder switching in the adder 154 so that the delay time τd of the programmable delay line 130 is controlled and the writing phases of the phase servo patterns are adjusted. However, the phase adjustment for correcting the displacement between the read heads by means of the correction table 124 is not performed, and while the phase angles φh for offset seek according to the head switching are being increased successively for each four cylinders, they are set to the register 132. As a result, the delay time of the programmable delay line 130 is controlled, and the phase servo patterns only for offset seek according to the head switching as shown in FIGS. 23A to 23D may be written.

In addition, the above embodiment exemplifies the case where one cycle of 360° of the phase servo patterns corresponds to the four cylinders, but a number of cylinders N corresponding to one cycle of 360° of the phase servo patterns can be set suitably as the need arises.

In addition, a feeding amount of the servo patterns for 1 cylinder is 1/3 track pitch or 1/4 track pitch as examples, but the feeding pitch may be reduced, namely, to 1/5 or 1/6 track pitch. On the contrary, the feeding amount may be increased, namely, to 1/2.5 or 1/2 track pitch.

Further, the present invention is not limited to the above embodiments and includes suitable modifications within a range that its objects and advantages are not deteriorated. Needless to say, the present invention is not limited by numerical values of the above embodiments.

Industrial Applicability

According to the present invention, the displace amounts of the read heads with respect to the write heads are measured for each cylinder position of the media surfaces of the heads, and the phases of the phase servo patterns are adjusted so that the relative displacement amounts between the read heads are substantially eliminated, and the phase servo patterns are written. As a result, even if relative displacement exist between the read heads, a change in the head position signals detected from the phase servo patterns due to the head switching is small enough to be ignored. As a result, time for locating at the time of head switching is shortened, and access stopping time for this time can be shortened so that the performance of the apparatus can be improved.

In addition, since the present invention does not require an offset operation of the head positions at the time of head switching by writing the phase servo pattern which eliminates the displacement between the read heads. For this reason, when the displacement amounts of the read heads with respect to the write heads increase, cylinder information using burst pattern exceeds a boundary of the adjacent track so as to be overlapped on another cylinder information, and misreading of the cylinder information possibly occurs. However, writing positions of the cylinder information are offset according to the displacement amounts so that the problem of the misreading is solved so that reliability of the reading of the cylinder information can be improved.

Further, in the present invention, as for the sequence access according to the head switching and the cylinder switching, when the phase servo patterns are adjusted to be offset by a moving amount obtained by dividing the the track pitch by a number of the heads in an order of the head numbers so as to be written. As a result, the position signals showing the track center due to the head switching are subject to offset seek by a predetermined pitch to the track center side of the next cylinder, and thus the head switching and the cylinder switching can be realized by the offset seek with same moving amount. The access stopping time of the reading and writing by means of the execution of a high-order command such as 1-track seek can be shortened, and the access performance in the sequential access can be improved sufficiently.

What is claimed is:

1. A servo information writing method of writing servo information including phase servo patterns onto data surfaces of plural media in a magnetic disk apparatus where heads having write heads and read heads integrally are arranged corresponding to the data surfaces of the plural media, said method comprising:

a measuring step of measuring displacement amounts D of the read heads with respect to the write heads in each head and each cylinder position on the media surfaces; and a position information writing step of adjusting phases of the phase servo patterns based on the measured displacement amounts D so that relative displacement amounts between the read heads are eliminated in each head and each cylinder position of the media surfaces so as to write the phase servo patterns.

2. The servo information writing method according to claim 1, wherein the position information writing step adjusts the phases of the phase servo patterns so that relative displacement amounts α of another read heads with respect to a specified read head are eliminated and writes the phase servo patterns.

3. The servo information writing method according to claim 2, wherein the position information writing step:

calculates the relative displacement amounts α of another read heads with respect to the specified read head based on the measured displacement amounts D in each cylinder position of each head; and converts the relative displacement amounts α into phase angles φ of the phase servo patterns; and writes the phase servo patterns onto the media surfaces of the specified read head in each cylinder position in a state that the phase angle φ is zero; and displaces the phase servo patterns by the phase angle φ so as to write the phase servo patterns onto the media surfaces of the read heads other than the specified read head.

4. The servo information writing method according to claim 1, wherein the position information writing step adjusts the phases of the phase servo patterns so that the measured displacement amounts D of the write heads with respect to the read heads are eliminated so as to write the phase servo patterns.

5. The servo information writing method according to claim 4, wherein the position information writing step:

converts the measured displacement amounts D into phase angles φ of the phase servo patterns in each cylinder position of each head; and displaces the phase servo patterns by the phase angles φ in each cylinder position of each head so as to write the phase servo patterns.

6. The servo information writing method according to claim 1, wherein:

the measuring step measures the displacement amounts D of the read heads with respect to the write heads by means of measuring cylinders provided in outer-to-inner plural positions on the media surfaces; and the position information writing step obtains displacement amounts of non-measuring cylinders by means of interpolation from the displacement amounts of the measuring cylinders, and adjusts the phases of the phase servo patterns based on the measured displacement amounts and the interpolated displacement amounts so that relative displacement amounts between the read heads are eliminated so as to write the phase servo patterns.

7. The servo information writing method according to claim 6, wherein the measuring step writes single burst pattern onto both sides of the track center alternatively by means of the write heads in each measuring cylinder with the phases being displaced, and measures the displacement amounts D of the read heads with the write heads based on head moving amounts to a position where read signals the paired burst patterns by means of the read heads are equal to each other.

8. The servo information writing method according to claim 1, further comprising the cylinder information writing step of offsetting cylinder information to be written with the phase servo patterns according to the displacement amounts of the read heads with respect to the write heads in each head and each cylinder position so as to write the cylinder information.

9. The servo pattern writing method according to claim 1, wherein the cylinder information writing step, in the case where the phase servo patterns are displaced by (1/n) track pitch unit for 1 cylinder in a state that N cylinders form 1 unit so as to be recorded, converts the displacement amounts of the read track center into head feeding amounts for (1/n) track pitch unit so as to offset-seek the phase servo patterns.

10. A storage device in which a plurality of heads integrally having write heads and read heads corresponding to data surfaces of plural media are located in arbitrary cylinder positions so as to perform recording/reproduction, and servo information including phase servo patterns is recorded onto the data surfaces of the plural media, wherein the phase servo patterns in which their phases are adjusted so that relative displacement amounts between the heads are eliminated are previously recorded onto the data surfaces of the plural media.

11. The storage device according to claim 10, wherein the phases of the phase servo patterns are adjusted so that relative displacement amounts α of other read heads with respect to a specified read head are eliminated, and the phase servo patterns are recorded on the data surfaces of the plural media.

12. The storage device according to claim 11, wherein the relative displacement amounts α of other read heads with respect to a specified read head are converted into phase angles φ of the phase servo patterns in each cylinder position of each head, the phase servo patterns are previously recorded onto the media surfaces of the especified read head in each cylinder position in a state that the phase angle φ is zero, and the phases are displaced by the phase angles φ so that the phase servo patterns are previously recorded onto the media surfaces of the read heads other than the specified read head.

13. The storage device according to claim 10, wherein the phases of the phase servo patterns are adjusted so that the displacement amounts D of the read heads with respect to the write heads are eliminated, and the phase servo patterns are previously recorded onto the data surfaces of the plural media.

14. The storage device according to claim 13, wherein the phase servo patterns are displaced by the phase angles φ of the phase servo patterns converted from the displacement amounts D in each cylinder position of each head so that the phase servo patterns are previously recorded onto the data surfaces of the plural media.

15. The storage device according to claim 10, wherein cylinder information to be written with the phase servo patterns is offset from a track center according to the displacement amounts of the read heads with respect to the write head in each head and each cylinder position so as to be previously recorded further onto the data surfaces of the plural media.

16. The storage device according to claim 15, wherein in the case where the phase servo patterns are displaced by (1/n) track pitch unit for 1 cylinder in a state that N cylinders form 1 unit so as to be recorded, the displacement amounts of the read track center are converted into head feeding amounts of the (1/n) track pitch unit, and the cylinder information which is subject to offset seek is previously recorded onto the data surfaces of the plural media.

17. A method of writing servo information including phase servo patterns onto data surfaces of plural media in a magnetic disk apparatus in which heads integrally having write heads and read heads corresponding to the data surfaces of the plural media, wherein in the case where a number of heads corresponding to the media surfaces is M, the phases of phase servo patterns are displaced by (1/M) track pitch in an order of the head numbers in the same cylinder positions of the media surfaces and the phase servo patterns are written so that position information read from the phase servo patterns by the read heads is displaced by the (1/M) track pitch in the order of the head numbers.

18. The method according to claim 17, wherein in the case where the phase servo patterns are recorded in a state that N cylinders form 1 unit, a phase angle φ corresponding to the (1/M) track pitch is calculated according to the following equation:

$$\phi = (360°/N) \cdot (1/M)$$

and the phase servo patters are displaced by the phase angle φ in the order of the head numbers so as to be written in the same cylinder positions of the media surfaces.

19. An apparatus in which a plurality of heads integrally having write heads and read heads corresponding to data surface of plural media are located in arbitrary cylinder positions and performs recording/reproduction, and servo information including phase servo patterns is recorded onto the data surfaces of the plural media, wherein in the case where a number of heads corresponding to the media surfaces is M, phases of the phase servo patterns are displaced by (1/M) track pitch in an order of the head numbers in the same cylinder positions of the media surfaces and the phase servo patterns are previously recorded onto the data surfaces of the plural media so that position information read from the phase servo patterns by the read heads is displaced by (1/M) track pitch in the order of the head numbers.

20. The apparatus according to claim 19, wherein in the case where the phase servo patterns are recorded in a state that N cylinders form 1 unit, the phase angle φ corresponding to the (1/M) track pitch is calculated according to the following equation:

$$\phi = (360°/N) \cdot (1/M),$$

and the phase servo patterns are displaced by the phase angle φ in the order of the head numbers in the same cylinder positions of the media surfaces so as to previously recorded onto the data surfaces of the plural media.

* * * * *